(12) United States Patent
Takase et al.

(10) Patent No.: US 7,908,374 B2
(45) Date of Patent: Mar. 15, 2011

(54) DEVICE, METHOD AND PROGRAM FOR PROVIDING MATCHING SERVICE

(75) Inventors: Toshiro Takase, Kanagawa-Ken (JP);
Akira Koseki, Kangawa-Ken (JP); Toru Nagano, Kanagawa-Ken (JP); Yuji Watanabe, Kangawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 11/755,084

(22) Filed: May 30, 2007

(65) Prior Publication Data

US 2007/0294432 A1    Dec. 20, 2007

(30) Foreign Application Priority Data

Jun. 16, 2006   (JP) .................................. 2006-167087
Apr. 17, 2007   (JP) .................................. 2007-107778

(51) Int. Cl.
*G06F 15/173* (2006.01)

(52) U.S. Cl. ........ 709/226; 709/225; 709/230; 709/248; 380/277; 380/278; 718/103; 718/104; 713/182; 713/189; 713/193; 726/2; 726/12

(58) Field of Classification Search .................. 709/206, 709/207, 229, 240, 248, 249, 225, 226, 230; 726/2, 12, 14; 713/168, 182, 189, 193; 380/255, 380/277, 278, 279; 718/103, 104

See application file for complete search history.

(56) References Cited

U.S. PATENT DOCUMENTS

| | | | | |
|---|---|---|---|---|
| 5,475,819 | A * | 12/1995 | Miller et al. | 709/203 |
| 6,480,885 | B1 * | 11/2002 | Olivier | 709/207 |
| 6,678,793 | B1 * | 1/2004 | Doyle | 711/133 |
| 6,795,860 | B1 | 9/2004 | Shah | |
| 6,816,907 | B1 * | 11/2004 | Mei et al. | 709/229 |
| 7,120,691 | B2 * | 10/2006 | Goodman et al. | 709/225 |

(Continued)

FOREIGN PATENT DOCUMENTS

| | | |
|---|---|---|
| JP | 2001186170 | 1/2003 |
| JP | 2004078515 | 3/2004 |
| JP | 2005134990 | 5/2005 |
| JP | 2005141401 | 6/2005 |
| JP | 2005182275 | 7/2005 |

OTHER PUBLICATIONS

A Private Stable Matching Algorithm, (online); [retrieved on Sep. 17, 2008]; retrieved from the Internet http://crypto.stanford.edu/~pgolle/papers/stable.pdf.

(Continued)

*Primary Examiner* — Shanto M Abedin
(74) *Attorney, Agent, or Firm* — Cantor Colburn LLP; Brian Lambert

(57) ABSTRACT

A computer for a service provider receives from each member of two groups who is a user of a service via a mediating computer, a priority list in which member IDs of the other group is permuted in the priority order of a user and processing information that are encrypted so as not to be decrypted by the mediating computer. The ID of the priority list is encrypted with an encrypting key that is common to all members. The computer for a service provider performs matching, with ID in the priority list being left encrypted when the list is decrypted. The computer for a service provider decrypts the processing information, makes it in a state in which the matching result can be decrypted based on the processing information by only a person concerned, and sends it to each member via the mediating computer.

3 Claims, 20 Drawing Sheets

U.S. PATENT DOCUMENTS

| | | | |
|---|---|---|---|
| 7,240,202 B1 * | 7/2007 | Orman | 713/169 |
| 7,461,149 B2 * | 12/2008 | Gasca et al. | 709/226 |
| 7,549,054 B2 | 6/2009 | Brodie et al. | |
| 7,672,440 B2 * | 3/2010 | Chen et al. | 379/209.01 |
| 7,756,940 B2 | 7/2010 | Sagawa | |
| 7,765,312 B2 | 7/2010 | Monette et al. | |
| 2004/0128383 A1 * | 7/2004 | Hinton | 709/225 |
| 2004/0165728 A1 * | 8/2004 | Crane et al. | 380/279 |
| 2007/0050331 A1 * | 3/2007 | Bauman et al. | 707/3 |
| 2007/0294432 A1 * | 12/2007 | Takase et al. | 709/248 |
| 2008/0133716 A1 * | 6/2008 | Rao et al. | 709/220 |

OTHER PUBLICATIONS

Desk-mates (Stable Matching) with Privacy of Preferences, and a new Distributed CSP Framework, [online]; [retrieved on Sep. 17, 2008]; retrieved from the Internet http://www.cs.fit.edu/~msilaghi/papers/IACP2004-discsp.pdf.

* cited by examiner a) IDENTIFICATION TABLE

| MEMBER | ID |
|---|---|
| MEMBER A | $ID_A$ |
| ⋮ | ⋮ |
| MEMBER E | $ID_E$ |
| MEMBER F | $ID_F$ |
| MEMBER G | $ID_G$ |
| ⋮ | ⋮ | b) PRIORITY ORDER OF MEMBER A

| MEMBER | PRIORITY ORDER |
|---|---|
| MEMBER E | 3 |
| MEMBER F | 1 |
| MEMBER G | 2 |
| ⋮ | ⋮ | c) PRIORITY LIST OF MEMBER A

| PRIORITY ORDER | ID |
|---|---|
| 1 | $ID_F$ |
| 2 | $ID_G$ |
| 3 | $ID_E$ |
| ⋮ | ⋮ | d) PRIORITY LIST OF MEMBER A AFTER ENCRYPTING ID

| PRIORITY ORDER | enc_Kc(ID) |
|---|---|
| 1 | enc_Kc($ID_F$) |
| 2 | enc_Kc($ID_G$) |
| 3 | enc_Kc($ID_E$) |
| ⋮ | ⋮ |

FIG. 7

LIST OF DESTINATION INFORMATION

| enc_Kc(ID) | DESTINATION INFORMATION |
|---|---|
| enc_Kc($ID_A$) | XXA@△△1 |
| enc_Kc($ID_B$) | XXB@△△2 |
| enc_Kc($ID_C$) | XXC@△△3 |
| ⋮ | ⋮ |

FIG. 8 a) LIST OF MATCHING INFORMATION

| enc_Kc(ID) | POINTER TO PRIORITY LIST | POINTER TO PROCESSING INFORMATION |
|---|---|---|
| enc_Kc($ID_A$) | POINTER $L_A$ | POINTER $L_A$ |
| enc_Kc($ID_B$) | POINTER $L_B$ | POINTER $L_B$ |
| enc_Kc($ID_C$) | POINTER $L_C$ | POINTER $L_C$ |
| ⋮ | ⋮ | ⋮ | b) LIST OF MATCHING RESULT INFORMATION

| enc_Kc(ID) | MATCHING RESULT |
|---|---|
| enc_Kc($ID_A$) | enc_$K_{EA}$[enc_Kc($ID_F$)] |
| enc_Kc($ID_B$) | enc_$K_{EB}$[enc_Kc($ID_E$)] |
| enc_Kc($ID_C$) | enc_$K_{EC}$[enc_Kc($ID_G$)] |
| ⋮ | ⋮ |

FIG. 9 a) PRIORITY LIST OF MEMBER A

| PRIORITY ORDER | ID |
|---|---|
| 1 | $ID_F$ |
| 2 | $ID_G$ |
| 3 | $ID_E$ |
| ⋮ | ⋮ | b) PROCESSING INFORMATION OF MEMBER A

| ORDER | ID |
|---|---|
| 1 | $enc\_K_{EA}(ID_F)$ |
| 2 | $enc\_K_{EA}(ID_G)$ |
| 3 | $enc\_K_{EA}(ID_E)$ |
| ⋮ | ⋮ |

FIG. 11 a) PRIORITY LIST OF MEMBER A

| PRIORITY ORDER | ID |
|---|---|
| 1 | $ID_F$ |
| 2 | $ID_G$ |
| 3 | $ID_E$ |
| ⋮ | ⋮ | b) PROCESSING INFORMATION OF MEMBER A

| ORDER | ID |
|---|---|
| 1 | $enc\_K_{pF}(ID_A)$ |
| 2 | $enc\_K_{pG}(ID_A)$ |
| 3 | $enc\_K_{pE}(ID_A)$ |
| ⋮ | ⋮ |

FIG. 12 a) PERMUTATION INFORMATION OF MEMBER A

ORDER 1 → ORDER 2
ORDER 2 → ORDER 4
ORDER 3 → ORDER 1
ORDER 4 → ORDER 3 b) REVERSE PERMUTATION INFORMATION OF MEMBER A

ORDER 1 → ORDER 3
ORDER 2 → ORDER 1
ORDER 3 → ORDER 4
ORDER 4 → ORDER 2 c) PRIORITY LIST OF MEMBER A

| PRIORITY ORDER | ID |
|---|---|
| 1 | $ID_F$ |
| 2 | $ID_G$ |
| 3 | $ID_E$ |
| 4 | $ID_H$ | d) PRIORITY LIST OF MEMBER A AFTER PERMUTATION ID

| ORDER | ID |
|---|---|
| 1 | $ID_E$ |
| 2 | $ID_F$ |
| 3 | $ID_H$ |
| 4 | $ID_G$ | e) PRIORITY LIST OF MEMBER A AFTER ENCRYPTING ID

| PRIORITY ORDER | ID |
|---|---|
| 1 | $enc\_Kc(ID_E)$ |
| 2 | $enc\_Kc(ID_F)$ |
| 3 | $enc\_Kc(ID_H)$ |
| 4 | $enc\_Kc(ID_G)$ |

FIG. 14 a) RESULT LIST OF MEMBER A AFTER DECRYPTING ID

| ORDER | ID |
|---|---|
| 1 | $ID_E$ |
| 2 | $ID_H$ |
| 3 | $ID_G$ |
| 4 | $ID_F$ | b) RESULT LIST OF MEMBER A AFTER PERMUTATION ORDER

| ORDER | ID |
|---|---|
| 1 | $ID_G$ |
| 2 | $ID_E$ |
| 3 | $ID_F$ |
| 4 | $ID_H$ | c) RESULT LIST OF MEMBER A

| ORDER | ID |
|---|---|
| 1 | $enc\_Kc(ID_G)$ |
| 2 | $enc\_Kc(ID_E)$ |
| 3 | $enc\_Kc(ID_F)$ |
| 4 | $enc\_Kc(ID_H)$ | d) PRIORITY LIST OF MEMBER A AFTER REVERSE PERMUTATION ORDER

| ORDER | ID |
|---|---|
| 1 | $enc\_Kc(ID_E)$ |
| 2 | $enc\_Kc(ID_H)$ |
| 3 | $enc\_Kc(ID_G)$ |
| 4 | $enc\_Kc(ID_F)$ |

FIG. 15

DEVICE, METHOD AND PROGRAM FOR PROVIDING MATCHING SERVICE

This application claims priority to Japanese Patent Application No Japanese Application No. 2006-167087, filed 16 Jun. 2006 and Japanese Application No. 2007-107778, filed 17 Apr. 2007, and all the benefits accruing therefrom under 35 U.S.C. §119, the contents of which in its entirety are herein incorporated by reference.

FIELD OF THE INVENTION

The present invention relates to a technique for providing a matching service, and more specifically to a technique for enabling the confidentiality of a priority list in which the members of two groups of users of the service put priorities on the members of the other group and the result of the matching to be kept.

BACKGROUND ART

If each member of two groups, such as a group of suppliers and a group of buyers, or a group of students who want to get a job and a group of companies which wants to get an employee, wants to make a pair with a particular member of the other group, the member whom he or she wants to make a pair with does not necessarily have him or her at the first priority on the list of whom the member wants to make a pair with him or her. Therefore, as a method for letting each of members as many as possible to make a pair with whom the member wants to make a pair, a method for each member in the two groups to order the members of the other groups and make a matching between the groups based on the priority list of each member is known. Specifically, according to a stable matching (see Non-Patent Document 1) presented in the paper by Gale and Shapley in 1962, so-called a blocking pair cannot be made.

It is not preferable to let members of the group know the contents of his or her priority list or the result of his or her matching, even in order to make a matching. As a solution to this problem, a third party provides a matching service can be considered. Each member sends his or her priority list to a service provider. The service provider, in turn, performs the matching based on the priority list of each member and then informs the member on the matching result. The priority list and the matching result, however, are confidential information, which are ones of the most important kind of information for the company and sensitive information for the individual. Thus, the both sides want to hide the information also from the third party.

As a conventional technique for enabling a party to confidentially get the information which is to be confidential, a technique for providing a mediating institute between an information providing institute and a user who is provided with information, letting the information providing institute provide the information for the user via the mediating institute and encrypting the information to be dealt by the mediating institute so as not to be decrypted by the mediating institute (see Patent Document 1).

[Non-Patent Document 1] "College Admissions and the Stability of Marriage", written by D. Gale and L. S. Shaplery, American Mathematical Monthly, $69^{th}$ volume, 1962, pages 9-14

[Patent Document 1] Published Unexamined Patent Application No. 2003-18142

Even if a user is enabled to get confidential information by hiding destination information on the user from the service provider by using the abovementioned technique, the contents of the priority list that is required for making matching cannot be hidden from the service provider, letting the service provider identify the user at last from a priority list collected from each member. Then, a method for allocating ID for each member, allowing only the member of the group to know relationship between the members and the IDs and sending a priority list of IDs to the service provider can be considered.

In the abovementioned case, whether the contents of the priority list or the matching result can be kept confidential or not depends on each member's management of the information indicating relationship between the members and IDs. If the information indicating the relationship between the members and IDs is leaked to the outside of the group, the service provider gets to know the contents of the priority list and the matching result and also identify the user. If a computer for a service provider is hacked, the information is further leaked to a third party. It is difficult to make all the members of the group to keep security management to avoid such an incident.

Then, the present invention intends to provide a device, a method and a program for providing a highly secured matching service that hides the contents of a priority list and a matching result from a service provider and a third party even if relationship between a member and his or her ID is leaked outside.

SUMMARY OF THE INVENTION

The present invention for achieving the abovementioned object is realized by a program for a service provider that provides a matching service performed on a computer for the service provider as below. The matching service treated in the present invention is a matching service for two groups, each of which is coprime to the other group and has a priority list on which each member puts members in the other group in the ascending order of priority. The program for the service provider causes the computer for the service provider to perform each of the steps (a) to (g) shown below.

(a) Receiving, through a mediating computer that mediates information exchanged between the service provider and each member in two groups who uses the service, from each member in the two groups, a set of his or her identification information encrypted with an encrypting key common to all member in the two groups, a priority list on which identification information of members in the other group encrypted with the common encrypting key is permuted in his or her priority order, and processing information that is used for processing his or her matching result in a state in which the result can be decrypted by only computers for persons concerned, wherein the priority list and the processing information are encrypted with an encrypting key of the service provider. (b) Storing for each of the received sets for each member, the priority list and the processing information in a matching information storing section in relation with his or her identification information that is encrypted with the common encrypting key; (c) Decrypting the priority list of each member read out from the matching information storing section with a decrypting key kept in the computer for the service provider that corresponds to the encrypting key of the service provider. (d) Performing the matching between the two groups based on his or her identification information of each member and the decrypted priority list of each member, with his or her identification information of each member and identification information of members in the other group on the priority list of each member being kept as encrypted with the common encrypting key. (e) Decrypting the processing information of each member read out from the matching information storing section with the decrypting key kept in the computer for the service provider. (f) Processing the matching result of each member in a state in which the result can be decrypted by only computers for persons concerned based on decrypted processing information of each member. (g) sending a set of his or her identification information encrypted with the common encrypting key and the processed his or her matching result to the mediating computer.

Preferably, the common encrypting key is kept in a computer for a user of each member in the two groups. The processing information stored in relation with his or her identification information that is encrypted with the common encrypting key is the same key as an encrypting key kept in his or her computer for a user. The processing step of (f) includes encrypting identification information of the counterpart members who makes a pair with him or her that is encrypted with the common encrypting key with the same key as the encrypting key kept in his or her computer for the user for each member in the two groups, and storing it in a matching result storing section in relation with identification information of each member that is encrypted with the common encrypting key.

Preferably, the common encrypting key is deleted after it is used for encryption in the computer for a user of each member in the two groups. The processing information stored in relation with his or her identification information that is encrypted with the common encrypting key is a processing list in which identification information of each member in the other group is encrypted with an encrypting key kept in his or her computer for the user and permuted in the priority order in his or her priority list. Then, the processing step of (f) includes for fetching identification information of the counterpart member, which is placed at the same position as that of the counterpart member who makes a pair with him or her in his or her priority list, from his or her processing list for each member, and storing it in the matching result storing section in relation with his or her identification information that is encrypted with the common encrypting key.

Yet preferably, the common encrypting key is deleted after it is used for encryption in the computer for a user of each member in the two groups. The processing information stored in relation with his or her identification information that is encrypted with the common encrypting key is a processing list in which his or her identification information is encrypted with an encrypting key corresponding to a decrypting key that is kept in the computer for a user of each member in the other group and permuted in the priority order of his or her priority list. Then, the processing step of (f) includes fetching his or her identification information, which is placed at the same position as that of the counterpart member who makes a pair with him or her in his or her priority list, from his or her processing list for each member, and storing it in the matching result storing section in relation with the identification information of the counterpart member that is encrypted with the common encrypting key.

Yet preferably, the priority order of the priority list that is stored in relation with his or her identification information that is encrypted with the common encrypting key is permuted according to permuting information kept in his or her computer for the user. The processing information stored in relation with his or her identification information that is encrypted with the common encrypting key is inverse permuting information for recovering the original order of the priority order that is permuted according to the permuting information kept in his or her computer for the user. Then the decrypting the priority list with the decrypting key kept in the computer for the service provider step(c) includes decrypting the processing information of each member with the decrypting key kept in the computer for the service provider and recovering the original order of the priority order of the priority list of each member by permuting it based on the inverse permuting information of each member that is obtained as a result. The processing step of (f) includes creating a result list of identification information of members in the other group that is encrypted with the common encrypting key so that the identification information of the counterpart member who makes a pair with him or her is placed at a predetermined position, and permuting the created result list based on his or her inverse permuting information and storing it in the matching result storing section in relation with his or her identification information that is encrypted with the common encrypting key for each member.

Yet preferably, the common encrypting key is kept in the mediating computer. Then, the identification information of each member in the other group on the priority list of each member, which is received by the computer for a service provider, and his or her identification information are encrypted by the mediating computer with the common encrypting key. His or her identification information that is encrypted with the common encrypting key and sent to the mediating computer and the identification information of members in the other group that is encrypted with the common encrypting key in his or her result list sent to the mediating computer are decrypted by the mediating computer with the common encrypting key.

Yet preferably, the matching service provided by the service provider is a stable matching service.

The present invention to achieve the abovementioned objects is realized by a program for a service provider below. The program for a service provider causes a computer to execute each of the steps (a) to (i) below.

(a) Receiving from each computer for a user of each member in two groups who uses a service via a plurality of mediating computers that mediate information sent to the service provider, a set of his or her identification information that is transferred by a first transfer function that is selected in his or her computer, a priority list in which the identification information of each member in the other group, which is permuted in his or her priority order and transferred by the first transfer function, is permuted by a permuting function that is selected in his or her computer, a parameter composing a transfer inverse function which is an inverse function of the first transfer function, and a parameter composing a permuting inverse function which is an inverse function of the permuting function, both of which are encrypted with a first encrypting key of the computer for the service provider, and processing information to be used in processing a matching result in a state in which the result is decrypted by only the computer for a person concerned, wherein his or her identification information and the identification information of each member in the other group that is listed in the priority list are respectively transferred by a plurality of second transfer functions, each of which is selected in each of the mediating computers. (b) Storing the priority list, the parameter composing the transfer inverse function and the parameter composing the permuting inverse function, and the processing information in a matching information storing section in relation with his or her identification information for the received abovementioned set for each member. (c) Decrypting the parameter composing the transfer inverse function and the parameter composing the permuting inverse function of each member that are read out from the matching information storing section with the first decrypting key that is kept in the computer for a service provider corresponding to the first encrypting key of the service provider. (d) Applying the transfer inverse function of each member to his or her identification information that is read out from the matching information storing section. (e) Applying the transfer inverse function and permuting inverse function of each member to the priority list of each member that is read out from the matching information storing section. (f) Performing matching between the two groups based on his or her identification information and the priority list of all members with his or her identification information and the identification information of each member in the other group on the priority list being transferred by the plurality of second transfer functions. (g) generating a plurality of second different encrypting keys for each pair obtained as a result of the matching. (h) processing, for each member in the two groups, his or her second encrypting key and his or her matching result in a state in which they are decrypted by only his or her computer for a user based on said processing information that is stored in said matching information storing section in relation with his or her identification information. (i) Publicizing the processed second encrypting key and matching result of each member.

Preferably, the matching result is a position of the counterpart member who makes a pair with him or her in his or her priority list of a person in concerned.

Also preferably, each member can make an encrypted communication with the counterpart member who makes a pair with him or her by using the second encrypting key which can be decrypted in his or her computer for the user.

The present invention has been described as a program for a service provider that is executed on the computer for a service provider, however, the present invention can be recognized as a storing medium that stores the abovementioned program, a method including each step of the abovementioned program and a computer for a service provider that reads the abovementioned program in memory and executes the program.

The present invention for achieving the above mentioned object is realized by a mediating program that is executed on a mediating computer, which mediates information exchanged between a service provider and each member in two groups who uses the service. In the first embodiment of the present invention, the mediating program causes the mediating computer to perform the steps below. a) receiving from a computer for a user of each member, a first set including his or her destination information, his or her identification information encrypted with a common encrypting key that is common to all members in the two groups, a priority list in which identification information of members in the other group that is encrypted with the common encrypting key is permuted in his or her priority, and processing information used for processing a matching result in a state in which the result can be decrypted by only computers for persons concerned, wherein the priority list and the processing information are encrypted with an encrypting key of the service provider. b) extracting his or her destination information from the received first set of each member and storing it in destination information storing section in relation with his or her identification information encrypted with the common encrypting key. c) sending the first set of each member from which his or her destination information is extracted to a computer for the service provider. d) receiving from the computer for the service provider, a second set including his or her identification information that is encrypted with the common encrypting key and his or her matching result that is processed based on the processing information. e) reading destination information of the matching result from the destination information storing section by using his or her identification information that is encrypted with the common encrypting key included in the second set with the matching result as an index to send the matching result to a computer for a user of each member having the read destination information.

The present invention for achieving the above mentioned object is realized by a program for a user that is performed on the computer for a user who uses the matching service provided by the service provider. In the first embodiment of the present invention, the program for a user performs on a computer for a user each of the steps below. a) storing a table indicating relationship between each member in two groups who uses the service and identification information of each member and a common encrypting key that is common to all members in the two groups. b) creating a priority list in which identification information of members in the other group is permuted in a priority order of a user. c) Encrypting the identification information of members in the other group on the priority list and the identification information of the user with the common encrypting key. d) creating processing information that is used by a service provider for processing a matching result in a state in which the result is decrypted by only computers for persons concerned with a processing key. e) encrypting the priority list and the processing information with an encrypting key corresponding to a decrypting key that is kept by the service provider. f) sending to a mediating computer that mediates information exchanged between the service provider and the user, a set including the user's destination information, the user's identification information encrypted with the common encrypting key, a user's priority list in which identification information of members in the other group is encrypted with the common encrypting key, and processing information, wherein the priority list and the processing information are encrypted with the encrypting key of the service provider. g) receiving from the mediating computer, the matching result of the user that is processed based on the processing information. h) decrypting the matching result of the user based on at least either the common encrypting key or the processing key.

In another embodiment of the present invention, the mediating program causes the mediating computer to perform each of the steps below. a) receiving from a computer for a user of each member, a first set including his or her destination information, his or her identification information, a priority list in which identification information of members in the other group permuted in his or her priority order is further permuted according to permuting information kept by him or her, and inverse permuting information for recovering the original order of the priority order permuted according to the permuting information that is encrypted with the encrypting key of the service provider. b) extracting his or her destination information from the received first set of each member and storing it in destination information storing section in relation with his or her identification information. c) generating a common encrypting key. d) encrypting his or her identification information and identification information of members in the other group in his or her priority list with the common encrypting key for the received first set of each member. e) sending to a computer for the service provider, a second set including his or her identification information encrypted with the common encrypting key, the priority list in which identification information of members in the other group is encrypted with the common encrypting key and inverse permuting information that is encrypted with the encrypting key of the service provider for each member. f) receiving from the computer for the service provider, for each member, a third set of his or her identification information encrypted with said common encrypting key and a result list of identification information of members in the other group encrypted with said common encrypting key that is created so that identification information of the counterpart member who makes a pair with said him or her is placed at a predetermined position, wherein the identification information of members in the other group in said result list is permuted based on said his or her said inverse permuting information after said result list is created. g) decrypting his or her identification information encrypted with the common encrypting key and the identification information of members in the other group that is encrypted with the common encrypting key in the result list with the common encrypting key for the received third set of each member. h) reading destination information in the result list out from the destination information storing section by using his or her identification information that is included in the third set with the result list as an index and sending it to a computer for a user having the read destination information.

In another embodiment of the present invention, the program for a user causes the computer for a user to perform each of the steps below. a) storing a table indicating relationship between each member of two groups who uses the service and the member's identification information. b) creating a priority list in which identification information of members in the other group is permuted in a priority order of a user. c) generating permuting information for permuting a priority order of the priority list and reverse permuting information for recovering the original order of the priority order that is permuted according to the permuting information. d) permuting the priority order of the priority list according to the permuting information. e) encrypting the inverse permuting information with the encrypting key corresponding to a decrypting key kept by the service provider. f) sending to a mediating computer that mediates information exchanged between the service provider and the member, a set including 'the destination information' of the user, the identification information of the user, the priority list in which a priority order is permuted, and inverse permuting information that is encrypted with the encrypting key of the service provider. g) receiving from the mediating computer, the result list of identification information of members in the other group that is created so that identification information of the counterpart member who makes a pair with him or her is placed at a predetermined position, wherein the identification information of members in the other group is permuted based on the above mentioned inverse permuting information after said result list is created. h) fetching identification information of members in the other group that is placed at the predetermined position in the result list in which identification information of members in the other group is permuted according to the permuting information.

In another embodiment of the present invention, the mediating program causes each mediating computer of a plurality of mediating computers to execute each of the steps below. (a) Receiving from a computer for a user of each member via one or more the other mediating computers, a first set of his or her identification information that is transferred by a first transfer function that is selected in his or her computer for the user and transferred by a plurality of second transfer functions, each of which is commutative to the first transfer function of each member and is selected in each of said one or more the other mediating computers, a priority list in which the identification information of each member in the other group, which is permuted in his or her priority order and transferred by the first transfer function and by the plurality of second transfer functions, is permuted by a permuting function that is selected in his or her computer for the user, a parameter composing a transfer inverse function which is an inverse function of the first transfer function, and a parameter composing a permuting inverse function which is an inverse function of the permuting function, both of which are encrypted with the first encrypting key of the computer of the service provider and the second encrypting key of one or more the mediating computer other than the one or more the other mediating computers, and processing information to be used in processing a matching result in a state in which the result is processed by only the computer for a person concerned. (b) Decrypting the parameter composing the transfer inverse function and the parameter composing the permuting inverse function of each member that are included in the received first set with the second decrypting key kept in this mediating computer corresponding to the second encrypting key of this mediating computer. (c) Selecting the third transfer function commutative to the first transfer function of each member to transfer the received his or her identification information of each member and the received identification information of each member in the other group that is listed in the priority list of each member. (d) Transferring his or her identification information of each member and the identification information of each member in the other group that is listed in the priority list of each member, both of which are included in the received first set by using the selected third transfer function. (e) Creating a second set of the processed his or her identification information, the priority list, the parameter composing the transfer inverse function and the parameter composing the permuting inverse function, and the processing function for the received first set of each member, and sending the set to either the computer for a service provider or a rest mediating computer that has not mediated yet.

In yet another embodiment of the present invention, the program for a user causes the computer for a user to execute each of the steps below. (a) Creating the priority list in which the identification information of each member in the other group in two groups who uses a service in a priority order of a user. (b) Selecting a permuting function for permuting the order in the priority list and a permuting inverse function that is an inverse function of the permuting function, and applying the permuting function to the priority list. (c) Selecting a transfer function for transferring the identification information of each member in the other group and the identification information of the user and a transfer inverse function, which is an inverse function of the transfer function, and applying the transfer function to the identification information of each member that is listed in the priority list and the transfer function of the user. (d) Encrypting a parameter composing the permuting inverse function and a parameter composing the transfer inverse function with a public key of a service provider and a public key of a plurality of mediating computers that mediate information to be sent to the service provider. (e) Creating processing information that is used by a service provider to process matching result in a state in which the result is decrypted by only this computer for this user. (f) Sending a set of the processed identification information of a user, the priority list, the parameter composing the transfer inverse function and the parameter composing the permuting inverse function, and the processing function to one of the plurality of mediating computers. (g) recovering the matching result publicized by the service provider, which is processed based on the processing information, based on the processing information.

BRIEF DESCRIPTION OF THE DRAWINGS

These and other features, aspects, and advantages of the present invention will become better understood with regard to the following description, appended claims, and accompanying drawings, where:

FIG. 7a) shows an example of an identification table showing relationship between members and their identification information; b) shows an example of the priority information of the member A; c) shows the priority list of the member A; and d) shows the priority list of the member A after the identification information in the list is encrypted;

FIG. 8 shows an example of a list of destination information of each member kept in the mediating computer;

FIG. 9a) shows an example of a list of the matching information of each member kept in the computer for a service provider; and b) shows an example of a list of the matching result of each member kept in the computer for a service provider;

FIG. 11a) shows an example of the priority list of the user in the matching service according to the second embodiment; and b) shows an example of the processing information of the user M in the matching service according to the second embodiment;

FIG. 12a) shows an example of the priority list of the member M in the matching service according to the third embodiment; and b) shows an example of the processing information of the member M in the matching service according to the third embodiment;

FIG. 14a) shows an example of permuting information of the member A; b) shows an example of inverse permuting information that makes a pair with the permuting information shown in a); c) shows an example of the priority list of the member A, where members E F G and H belongs to the other group which is shown from the viewpoint of the member A; d) shows the priority list of the member A after the identification information in the list is encrypted; and e) shows the priority list of the member A after the identification information in the list is encrypted;

FIG. 15a) shows an example of the result list of the member A after the identification information is encrypted; b) shows an example of the result list of the member A after the order is permuted; c) shows an example of the result list of the member A; and d) shows an example of the result list of the member A after the order is reversely permuted;

DETAILED DESCRIPTION OF THE INVENTION

According to the present invention, as identification information of members in the other group in a priority list of each member who uses a matching service and his or her identification information are encrypted with a common encrypting key that is common to all members and used for matching by a matching service provider with the information being encrypted, highly secured matching service from which information such as the contents of the priority list and the matching result is leaked to the outside is provided.

The most preferred embodiments for implementing the present invention will be detailed with reference to the drawings. The embodiments below, however, do not limit the present invention described in the Claims. Nor all the combinations of features described in the embodiments are needed for the solution. The same components through the description of the embodiments are given the same number.

Figure 1:
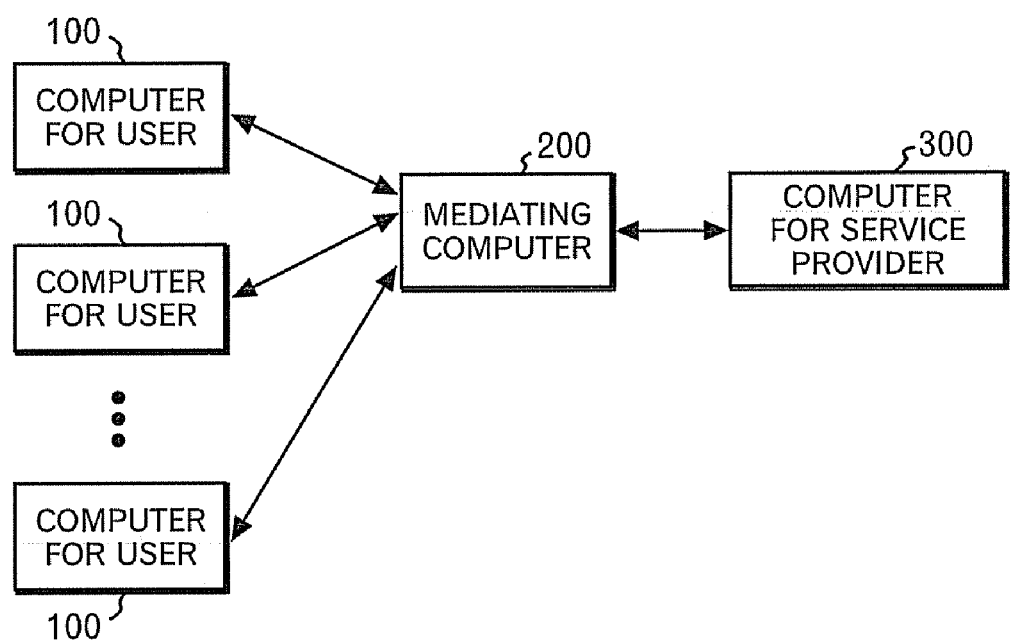
FIG. 1 is a diagram showing an example of a configuration of the entire system for providing a matching service according to the first embodiment of the present invention.

Although it is not shown in FIG. 1, the computers for a user 100 are connected with each other via a network, and each computer for a user 100 and the computer for a service provider 300 are connected with each other via a network. In the fifth embodiment to be described later, the plurality of mediating computers 200 mediate information to be sent from the computer for a user 100 in each of the two groups to the service provider 300. FIG. 1 is a diagram showing a configuration of the entire system for providing a matching service according to the first embodiment of the present invention. As shown in FIG. 1, a system for providing a matching service includes a computer for a user 100 for each member of two groups who use the service, a mediating computer 200 for mediating information exchanged between a service provider and each member, and a computer for a service provider 300 for providing the matching service. The computer for a service provider 300 and the mediating computer 200, and the mediating computer 200 and each computer for a user 100 are connected via a network such as the Internet.

Figure 2:
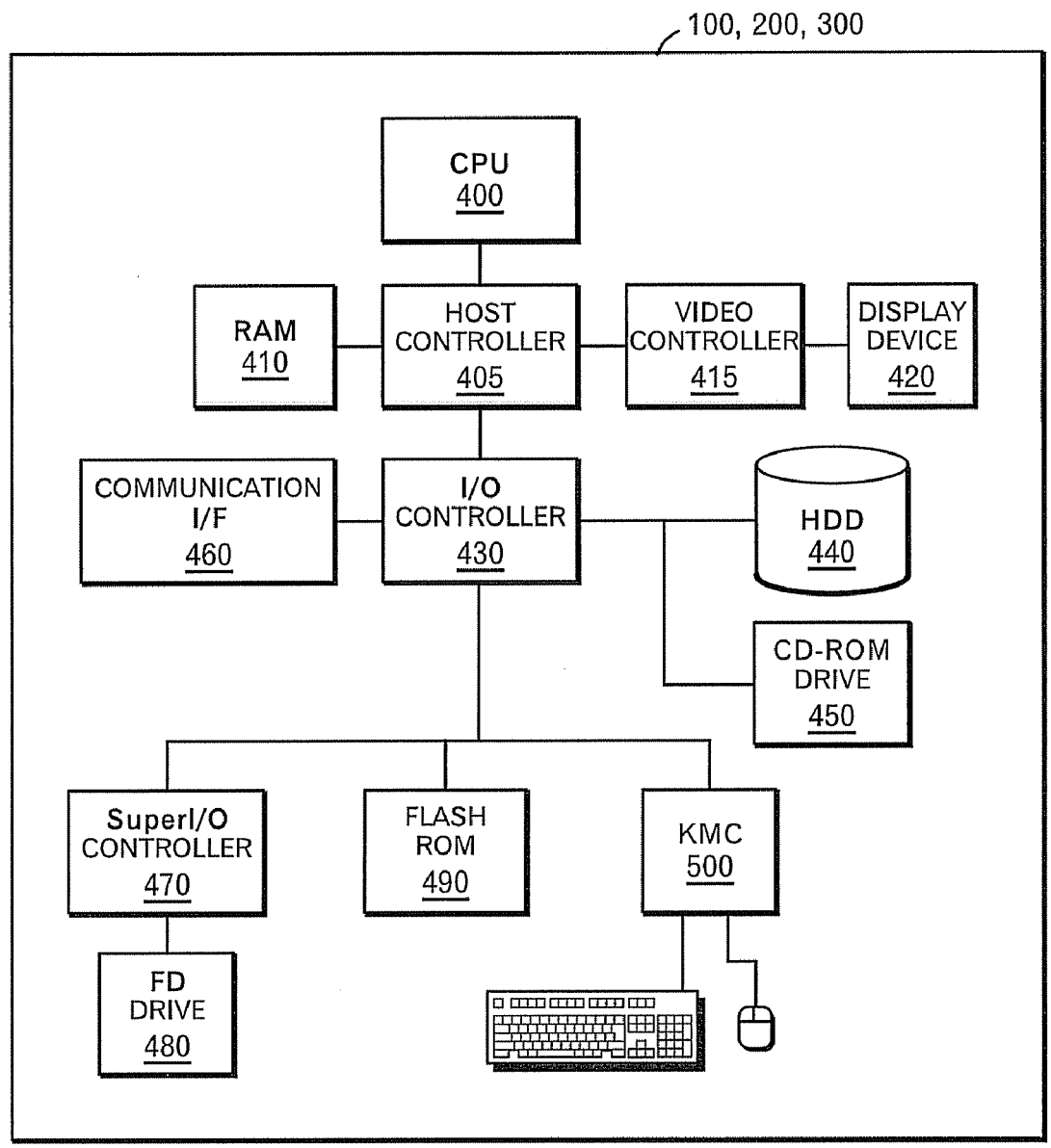
FIG. 2 shows an example of a hardware configuration the computer for a user, the mediating computer and the computer for a service provider according to the embodiment.

FIG. 2 shows an example of a hardware configuration of each of the above mentioned computers of the computer for a user 100, the mediating computer 200 and the computer for a service provider 300. Each computer includes a CPU peripheral section including a CPU 400, a RAM 410 and a video controller 415, which are connected with each other by a host controller 405, an input/output section including a communication interface 460, a hard disk drive 440 and a CD-ROM drive 450, which are connected with the host controller 405 by an input/output controller 430, and a legacy input/output section including a super I/O controller 470 that is connected with the input/output controller 430 and a flexible disk drive 480 that is connected with the super I/O controller 470, a flash ROM 490 and a keyboard mouse controller 500.

The host controller 405 connects between the RAM 410, the CPU 400 that accesses the RAM 410 with a high transfer rate, and the video controller 415. The CPU 400 operates based on a program stored in the flash ROM 490 or the RAM 410 for controlling over respective sections. The graphic controller 415 obtains image data that is generated by the CPU 400 or the like on a frame buffer that is provided in the RAM 410 and makes the image data displayed on a display device 420. The video controller 415 may include the frame buffer for storing the image data that is generated by the CPU 400 or the like instead.

The input/output controller 430 connects with the host controller the communication interface 460, the hard disk drive 440, and the CD-ROM drive 450, which are relatively fast input/output device. The communication interface 460 is connected with a gateway server for communication (not shown) by using the Ethernet (R) protocol by a wired cable, or has a wired LAN card and uses a communication protocol based on a standard such as IEEE 802.11 g to communicate with other computers via a network. The hard disk drive 440 stores a program and data used by a computer. The CD-ROM drive 450 reads a program or data from the CD-ROM and provides the program or data to the super I/O controller 470.

To the input/output controller 430, relatively slow input/output devices such as the flexible disk drive 480, the keyboard mouse controller 500 and the like and the flash ROM 490 are connected. The flash ROM 490 stores a boot program that is executed by the CPU 400 when the computer starts up, a program depending on the hardware of the computer and the like. The flexible drive 480 reads a program or data from the flexible disk and provides the program or the data to the super I/O controller 470 via the RAM 410. The super I/O controller 470 connects a flexible disk and various input/output devices via a parallel port, a serial port, a keyboard port, a mouse port or the like.

Now, a software configuration of each computer will be described. A computer program (an operating system and an application program) to be provided for the computer is provided for a user on a flexible disk or an optical recording medium such as a CD-ROM, a DVD, a PD or the like, a magneto-optical recording medium such as MD, or over a network such as for downloading the program from a Web site. The program is read out from the recording media and installed on a computer via the super I/O controller 470, or read out from another computer on the network, installed on the computer via the communication interface 460 and executed in the computer.

As an operating system that can be used on each computer, Windows (R) XP, Linux (R), MAC OS X from the Apple Computer and the like are known, however, the operating system is not limited to them. Each of the operating systems has a communicating function by using the TCP/IP protocol as a standard for preferably providing the communicating function required by the present invention. A program for a user is installed on the computer for a user 100 a mediating program is installed on the mediating computer, and a program for a provider is installed on the computer for a service provider 300 as application programs respectively. Each computer has such hardware configuration and software configuration cooperating to provide such functions as described in each of the embodiments.

Matching performed in the computer for a service provider 300 will be described first. An algorithm to be used for the matching is not limited in providing the matching service according to the present invention. If a service provider expects application for the service from many users, it can be easily supposed that the service provider preferably obtains such matching as more attractive as possible. A stable matching can be considered as one of the attractive matching.

The stable matching can be obtained when each member of two groups with a plurality of members, which are coprime to each other, has a priority list in which all members of the counterpart group are uniquely ordered in the descending order of the priority. Before describing the stable matching, a blocking pair will be described. When a supplier company A and a buyer company B do not make a pair for a matching M, and the supplier company A prefers the buyer company B to a buyer company C, with which the supplier company A made a pair for the matching M, and the buyer company B, in turn, prefers the supplier company A to a supplier company D, with which the buyer company B made a pair for the matching M, the supplier company A and the buyer company B are called a blocking pair. The stable matching refers to a matching in which no such a blocking pair is found.

The stable matching is present in any way. The algorithm by Gale-Shapley described in the paper listed as the Non-Patent Document 1 is known as an effective solution for obtaining a stable matching. The algorithm by Gale-Shapley will be described as an algorithm for obtaining such a stable matching. It should be note, however, an algorithm to be used is not limited in providing the matching service according to the present invention.

A case where the algorithm by Gale-Shapley is applied to the matching between a supplier and a buyer will be described.

1. First, a supplier side company offers a buyer side company, with which the supplier side company most desires to have a transaction, for a transaction.
2. The buyer side company selects a supplier side company, with which the buyer side company most desired to have a transaction, among the offered companies and keeps the selection.
3. The supplier side company, which is rejected to have a transaction, offers a buyer side company, with which the supplier side company most desires to have a transaction next.
4. If the buyer side company receives an offer for a transaction from a supplier side company which is more preferable than the supplier side company it keeps, i.e., a supplier side company of higher priority, the buyer side company releases the previously kept selection and keeps the supplier side company that newly made an offer.
5. The processes 3 and 4 are repeated until all the supplier side companies are not rejected for their offers.

As it is apparent that the number of candidates for offering a transaction decreases as the processes 3 and 4 are repeated, the algorithm by Gale-Shapley completes in a finite period of time.

Figure 3:
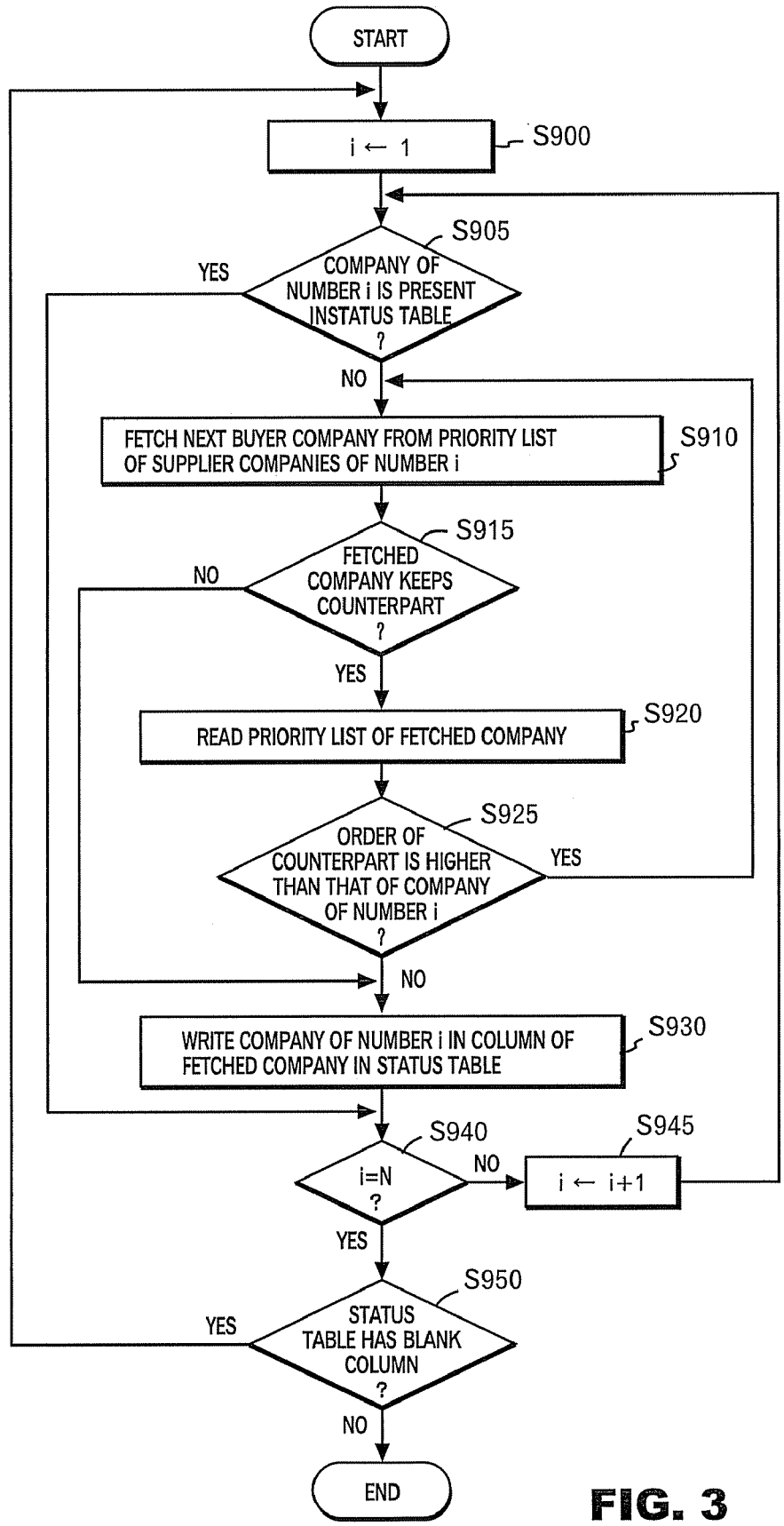
FIG. 3 is a flowchart showing an example of a flow of the matching processes according to the algorithm of Gale-Shapley.

FIG. 3 is a flowchart showing an example of a flow of the matching processes. The flowchart shown here is applied to such cases where the number of supplier side companies N and the number of buyer side companies M are the same or the number of supplier side companies N is more than the number of buyer side companies M. It is assumed that the supplier side companies are numbered starting from one. It is also assumed that each company has a priority list in which all companies are uniquely ordered in the descendant order of the priority is stored in a storage device of a computer that performs the matching. It is yet assumed that the current matching status can be checked on a status table, which is also stored in the storage device. Here, it is assumed that the status table has a column for buyer side companies. The fact that identification information of a certain supplier side company is written in a certain buyer side company means that the buyer side company currently keeps the supplier side company of the identification information.

The process starts from step 900, first, 1 is set for the number i of the supplier side company as an initial value. Next, the status table is read from the storage device, and whether the identification information of the company of the number i is written in the status table or not is determined (step 905). If the identification information of the company of the number i is found in the status table, the process proceeds to step 940 to be described later. If step 905 is first to be performed, each column of the status table is blank, thus, the process proceeds to step 910. At step 910, the top priority buyer side company which has not been examined is fetched from a priority list of supplier side company of the number i. The term "examined" means that the buyer side company has examined for whether it can make a pair with the supplier side company of the number i or not. When the buyer side company is fetched at step 910, the buyer side company in the priority list is marked to indicate that it has been examined for enabling determination on whether it has been examined or not in future. As such, the buyer side company that has once been examined as a candidate for a certain supplier side company is never examined as a candidate for the supplier side company.

Then, whether the fetched buyer side company currently keeps a counterpart or not is checked (step 915). That is performed as the column of the fetched buyer side company on the status table stored in the storage device is referred to. If a currently kept counterpart is found (step 915: YES), the priority list of the fetched buyer side company is read out from the storage device (step 920). Then, the priority of the counterpart company that is currently kept in the priority list of the fetched buyer side company is compared with the order of the company of the number i (step 925). If the order of the currently kept counterpart company is the higher (step 925: YES), the process returns to step 910. If it is NO at step 915, i.e., if the buyer side company currently has no counterpart, or if it is NO at step 925, i.e., if the order of the company of the number i is higher than that of the currently kept buyer side company, the identification information of the company of the number i is written in the column of the fetched buyer side company in the status table and the status table is updated (step 930).

The process proceeds to step 940 and whether i is N or not is determined. That is for guaranteeing that the steps from 910 to 930 are performed at least once for all the supplier side companies, i.e., that the matching has not completed without failing to consider a priority list of a company. If i is not N (step 940: NO), i is incremented by one and the process returns to step 905 (step 945). If i is N (step 940: YES), the status table is read out from the storage device and whether the status table has a blank column or nor, i.e., whether a buyer side company with no counterpart is found is present or not is determined (step 950). If the status table has a blank column (step 950: YES), the process returns to step 900 and the above mentioned series of processes are repeated for such a supplier side company with no counterpart. On the other hand, if the status table has no blank column (step 950: NO), it means that all the companies have found counterparts, thus, the process ends here. To a case where the number of supplier side companies N is less than the number of buyer side company M, the flowchart shown in FIG. 3 can also be applied. In such a case, however, the determination taken at step 950 needs to be changed to the determination of "whether identification information for N supplier side company are written in the status table or not".

Now, functions and operations of each computer will be described. In the present invention, the service provider and each member of the two groups who uses the service exchange information via the mediating computer 200. Therefore, the matching result is processed in a state in which the result is decrypted by only computers for persons concerned before the matching result is sent to each member. Here, some methods for processing the matching result are considered. Four embodiments of different processing methods will be considered below. Thereafter, the fifth embodiment in which the matching result is publicized without sent to each member will be described.

First Embodiment

Figure 4:
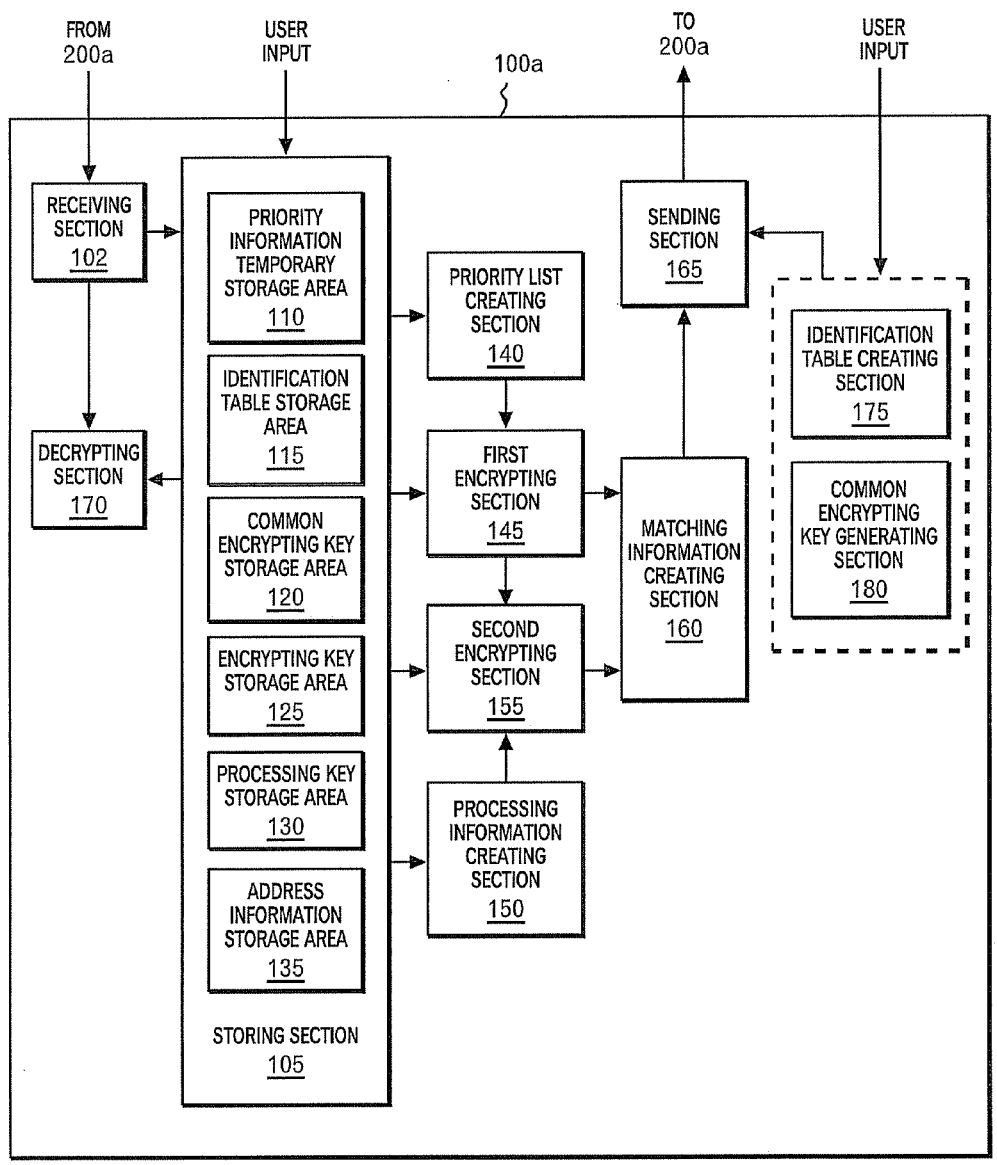
FIG. 4 is a diagram showing an example of a functional configuration of a computer for a user according to the first embodiment to the third embodiment.

FIG. 4 shows a functional configuration of a computer for a user 100a according to the first embodiment. In the first embodiment, the program for a user stored in the hard disk of the hard disk drive 440 is loaded on the RAM 410 under the operating system's operation in response to the user's operation, issues a command to the CPU 400 or the other peripheral devices by such a process of the program to call a predetermined API routine of the operating system and causes the computer for a user 100a to function as a receiving section 102, a storing section 105, a priority list creating section 140, a first encrypting section 145, a processing information creating section 150, a second encrypting section 155, a matching information creating section 160, a sending section 165 and a decrypting section 170. The storing section 105 further includes a priority information temporary storage area 110, an identification table storage area 115, a common encrypting key storage area 120, an encrypting key storage area 125, a processing key storage area 130, and an destination information storage area 135. Although the storage areas are shown as in the same storing section 105 for convenience in FIG. 4, they may actually be areas present in a plurality of physically separated storage devices, such as in the HDD 440 and the FD drive 480, for example.

In the embodiment, a member is selected from the two groups for coordinating the groups, and the selected member allocates each piece of identification information for each member and securely distributes the common encrypting key in a well-known method, which is common to all the members, by encrypting the key with a public key for each group. The program for a coordinating user further causes the computer for a user 100a to function as an identification table creating section 175 and a common encrypting key generating section 180. The identification table crating section 175 creates an identification table that indicates relationship between members and the members' identification information by allocating suitable identification information for each member. The coordinating member may directly perform the allocation of the identification information. In such a case, the identification information table creating section 175 creates an identification table based on identification information for each member that is entered by the coordinating member from an input device such as a keyboard. FIG. 7a) shows an example of the identification table. Here, $ID_X$ represents the identification information allocated to a member X. The common encrypting key generating section 180 generates the common encrypting key that is common to all members. The common encrypting key generated here fulfills the conditions below.

Assuming the common encrypting key is represented as $K_C$ and the result of the identification information ID encrypted with the common encrypting key $K_C$ is represented as enc_$K_C$ (ID), the common encrypting key $K_C$ fulfils: if enc_$K_C$ (ID$_1$)=enc_$K_C$ (ID$_2$), ID$_1$=ID$_2$. As an example of an encrypting method fulfilling such conditions, a private key encrypting method such as Data Encryption Standard(DES) and a public key encrypting method such as an original Rivest Shamir Adleman (RSA) are known. In the embodiment, the private key encrypting method, in which the same key is used for both encryption and decryption, is used. Any secure encrypting method other than DES, which is as secure as the DES or more secure than the DES, such as the AES, can be used, if only it is a private key encrypting method. The result of information X encrypted with an encrypting key Y is represented as enc_$K_Y$ (X) below. The created identification table and the generated common encrypting key are sent by the sending section 165 of the computer for a coordinating user 100a to the computer for a user 100a of each member. The receiving section 102 of the computer for a user 100a of each member receives the identification table and the common encrypting key and stores them in the identification table storage area 115 and the common encrypting key storage area 120.

The encrypting key storage area 125 stores an encrypting key corresponding to a decrypting key kept in the computer for a service provider 300a. In using the matching service, each member acquires an encrypting key of the service provider from the service provider. In the embodiment, a decrypting key kept in the computer for a service provider 300a is a private key in a public key encrypting method, and the encrypting key of the service provider, which is acquired by the user, is a public key corresponding to the private key. As the public key encrypting method, the elliptic-curve cryptography, which is as secure as the RSA or more secure than the RSA, can be used as well as the RSA. As such, the computer for a service provider 300a generates a set of keys in advance and publicize the keys to be used in encryption on a homepage or the like to make the key of the service provider always available for the users of the service. As another method, the computer for a service provider 300a may generate a set of keys in response to reception of an application for a service from the coordinating member and send the key to be used to the encryption to the coordinating member.

The priority information temporary storage area 110 stores priority information of members in the counterpart group, which are entered by a user who is a user of the computer for a user 100a, from an input device such as a keyboard. FIG. 7b) shows an example of the priority information of the member A. Here, members E, F, G, . . . in the table are members belonging to the counterpart group from the viewpoint of the member A. The priority list creating section 140 creates the priority list in which identification information of the counterpart members are permuted in the priority order of the user by using the priority information of the members in the counterpart group read out from the priority information temporary storage area 110 and an identification table indicating relationship between the members and their identification information read out from the identification table storage area 115. With reference to the examples of FIG. 7a) and b), the priority list creating section 140 of the member A copies the table of FIG. 7b) and sorts the copied table in the descending order of the priority. In the permuted table, the priority list creating section 140 updates the members' names with the identification information read out from the table of FIG. 7a). In this manner, the priority list shown in FIG. 7c) is finally crated. In the embodiment, the priority information in the priority information temporary storage area 110 is deleted from the computer for a user 100a after the priority list is created.

The first encrypting section 145 receives the priority list and identification information of the user from the priority list creating section 140 and encrypts the identification information of the members of the counterpart group in the priority list and the identification information of the user with the common encrypted key read out from the common encrypting key area 120 respectively. FIG. 7d) shows the priority list of the member A after the first encrypting section 145 encrypted the identification information.

The processing information creating section 150 reads out a processing key from the processing key storage area 130 and creates processing information to be used by the service provider to process the matching result in a state in which the matching result is decrypted only by the computer for a user 100a. In the embodiment, the processing key is an encrypting key kept in the computer for a user 100a and the processing information is a copy of the encrypting key. That is, in the first embodiment, the matching result is encrypted with a private key encrypting method by which encryption and decryption are performed by the same key.

The second encrypting section 155 reads the public key of the service provider out from the encrypting key storage area 125 and encrypts the priority list passed from the first encrypting section 145 and the processing information passed from the processing information creating section 150 with the public key, respectively. The destination information storage area 135 stores the destination information of the user to be used for specifying an address to which data is sent when it exchanges data via the network, such as an electric-mail address.

The matching information creating section 160 creates a set of matching information from the destination information of the user read out from the destination information storage area 135, the identification information of the user, which is encrypted with the common encrypting key passed from the first encrypting section 145, the priority list, which is encrypted with the public key of the service provider passed from the second encrypting section 155, and the processing information, which is also encrypted with the public key of the service provider. A format for the set of the matching information is not limited, though, the format is decided among the computer for a user 100a, the mediating computer 200a and the computer for a service provider 300a, letting each member to use the common format. The sending section 165 sends the set of matching information passed from the matching information creating section 160 to the mediating computer 200a.

The receiving section 102 also receives the matching result of the user, which is encrypted by the service provider based on the processing information from the mediating computer 200a. The decrypting section 170 decrypts the matching result passed from the receiving section 102 based on at least one of the common encrypting key stored in the common encrypting key storage area 120 and the processing key stored in the processing key storage area 130. In the embodiment, the decrypting section 170 finally obtains the matching result by decrypting the matching result with the encrypting key as the processing key read out from the processing key storage area 135 and further decrypting the result with the common encrypting key read out from the common encrypting key storage area 120.

Figure 5:
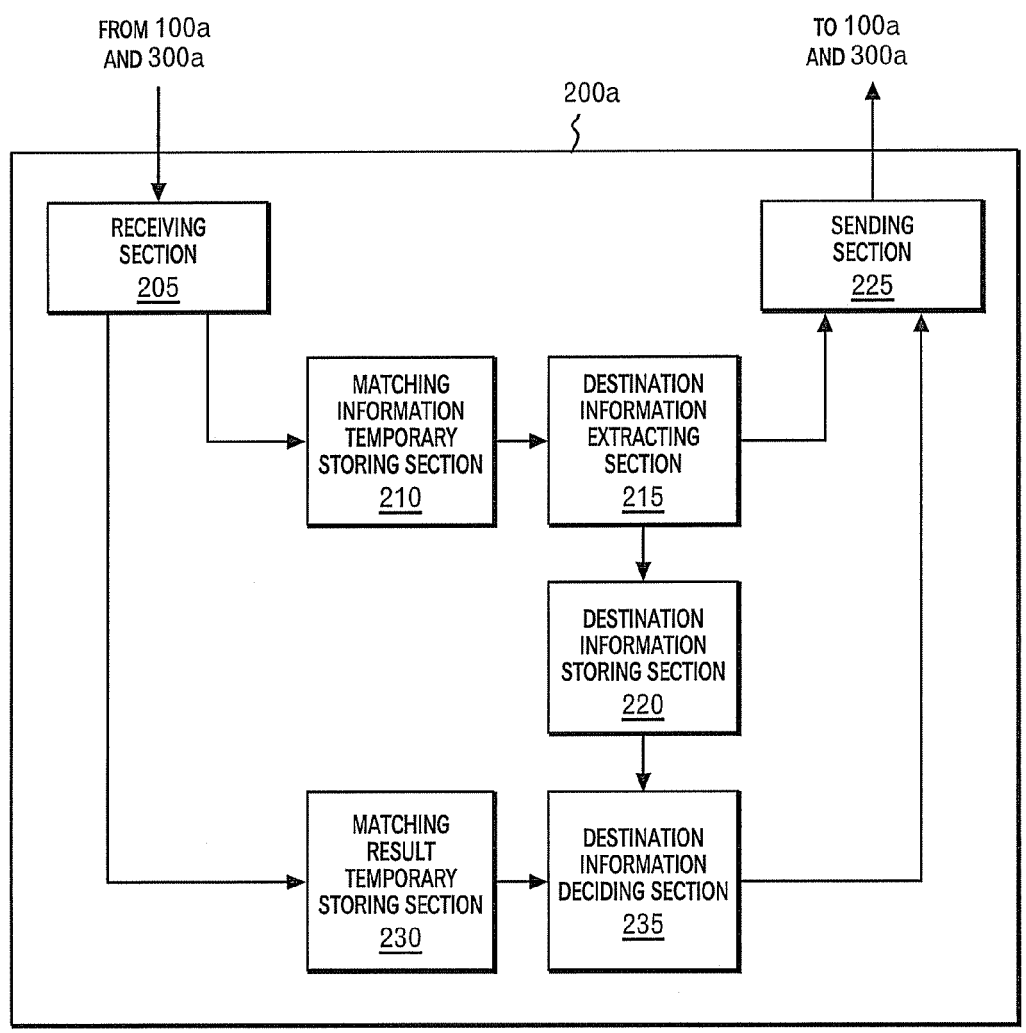
FIG. 5 is a diagram showing a functional configuration of the mediating computer according to the first embodiment to the third embodiment.

FIG. 5 shows a functional configuration of the mediating computer 200a according to the first embodiment. In the first embodiment, the mediating program stored in the hard disk of the hard disk drive 440 is loaded on the RAM by the operation of the operating system in response to the user's operation, issues a command for the CPU 400 and the other peripheral appliances by the program's processes such as calling a predetermined API routine of the operating system and causes the mediating computer 200a to function as a receiving section 205, the matching information temporary storing section 210, an destination information extracting section 215, an destination information storing section 220, a sending section 225, a matching result temporary storing section 230 and an destination information deciding section 235. As each of the storing section, the HDD 440, for example, can be used. As the mediating computer 200a is for coordinating the destination information of the service user while hiding the destination information of the service user from the service provider, it is preferably realized by a computer for a member selected as a coordinator.

The receiving section 205 receives the set of the matching information from each of the computers for a user 100a. The set of the matching information received by the mediating computer 200a includes his or her destination information, his or her identification information, which is encrypted with the common encrypting key, the priority list, in which identification information of members in the counterpart group that are encrypted with the common encrypting key are permuted in the priority order, and the processing information used for processing the matching result in a state in which the matching result is decrypted by only computers for persons concerned. The priority list and the processing information are encrypted with the public key of the service provider.

The matching information temporary storing section 210 temporally stores the received set of matching information of each member. The destination information extracting section 215 reads the set of matching information of each member from the matching information temporary storing section 210, extracts his or her destination information from there, and stores the information in the destination information storing section 220 in relation with his or her identification information that is encrypted with the common encrypting key included in the read out set. The above mentioned mediating computer 200a knows the format of the set of the matching information sent from the computer for a user 100a in advance. The extraction of the destination information is performed by using the place or the file name of the destination information in the set of the matching information, for example. If the place information is used, padding is performed so that the place of the other information is changed due to the extraction of the destination information. FIG. 8 shows an example of a list of destination information stored in the destination information storing section 220. The set of the matching information, from which the destination information is extracted, is sent by the sending section 225 to the computer for a service provider 300a.

The receiving section 205 receives the set of matching result information including his or her matching result that is encrypted based on his or her identification information and the processing information that are encrypted with the common encrypting key. The matching result temporary storing section 230 temporally stores the received set of the matching result information of each member.

The destination information deciding section 235 reads out the set of the matching result information from the matching result temporary storing section 230. Then, the destination information deciding section 235 reads the destination information of the matching result from the destination information storing section 220 by using his or her identification information that is encrypted with the common encrypting key included in the set of the matching result information as the matching result as an index. The destination information deciding section 235 passes the destination information and the matching result to the sending section 225. Then, the sending section 225 sends the received matching result to a computer for a user 100a having the destination information received from the destination information deciding section 235.

Figure 6:
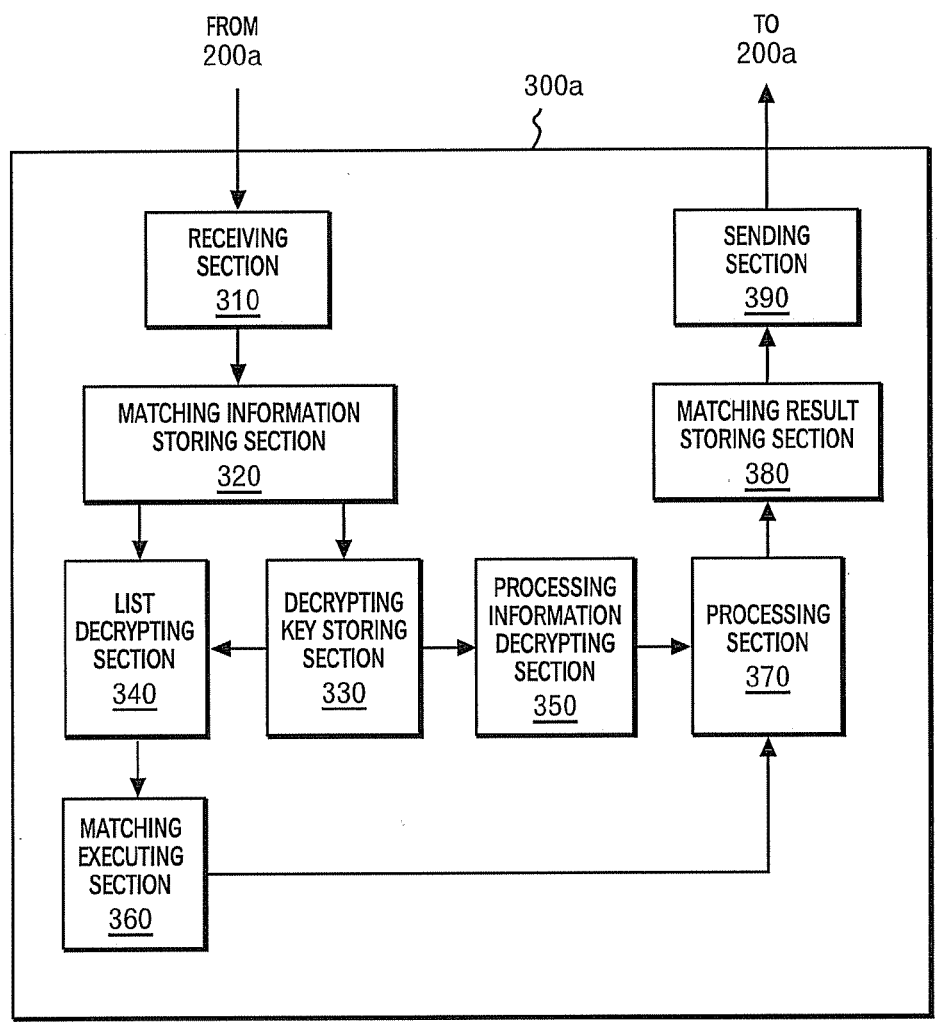
FIG. 6 is a diagram showing a functional configuration of the computer for a service provider according to the first embodiment to the third embodiment.

FIG. 6 shows a functional configuration of the computer for a service provider 300a according to the first embodiment. In the first embodiment, the program for a service provider stored in the hard disk of the hard disk drive 440 is loaded on the RAM 410 by the operation of the operating system in response to the user's operation, issues a command for the CPU 400 and the other peripheral appliances by the program's processes such as calling a predetermined API routine of the operating system and causes the computer for a service provider 300a to function as a receiving section 310, a matching information storing section 320, a decrypting key storing section 330, a list decrypting section 340, a processing information decrypting section 350, a matching performing section 360, a processing section 370, a matching result storing section 380 and a sending section 390. As each of the above mentioned storing section, the HDD 440, for example, can be used.

The receiving section 310 receives the set of the matching information from each computer for a user 100a via the mediating computer 200a. The set of the matching information received at the computer for a service provider 300a includes his or her identification information that is encrypted with the common encrypting key, the priority list in which identification information of members in the counterpart group that are encrypted with the common encrypting key are permuted in his or her priority order, and the processing information to be used for processing the matching result in a state in which the matching result is decrypted by only computers for persons concerned 100a. Here, the priority list and the processing information are encrypted with the public key of the service provider. In the embodiment, the processing information is the same private key as that kept in the computer for a user 100a as mentioned above.

The matching information temporary storing section 320 stores the received set of the matching information of each member in relation with his or her identification information, which is the priority list and the processing information encrypted with the common encrypting key. As an example, the matching information temporary storing section 320 stores a list of the set of matching information in which a pointer indicating the place where the priority list and the processing information are stored is related with his or her identification information that is encrypted with the common encrypting key, as shown in FIG. 9a). As mentioned above, the computer for a service provider 300a knows the format of the set of the matching information sent from the computer for a user 100a in advance. The identification of each piece of information in the received set of matching information is performed by using the place and the file name of the information in the set of the matching information, for example. The decrypting key storing section 330 stores a private key corresponding to the public key of the service provider. The list decrypting section 340 reads the priority list of each member and his or her identification information that is encrypted with the common encrypting key from the matching information temporary storing section 320 and decrypts the priority list of each member with the private key read out from the decrypting key storing section 330. Then, the list decrypting section 340 passes the decrypted priority list of each member to the matching performing section 360 in relation with the respective members' identification information that are encrypted with the common encrypting key.

The matching performing section 360 performs matching based on his or her identification information and the decrypted priority list of all the members, with his or her identification information and the identification information of members in the counterpart group in the priority list being as they are as encrypted with the common encrypting key. Specific matching methods are as described above. In the present invention, identification information of each member in the priority list is encrypted. As the encryption is performed by using the common encrypting key $K_C$ that is common to all the members and if enc_$K_C$ ($ID_1$)=enc_$K_C$ ($ID_2$), i.e., if the identification information after encryption is the same, $ID_1$=$ID_2$, i.e., the identification information is also the same. Thus, the abovementioned matching method can be used as it is. It is a matter of course that the matching result is the identification information of the counterpart that is encrypted with the common encrypting key and not the identification information of the counterpart who made a pair with his or her. The matching performing section 360 passes the matching result of each member to the processing section 370 in relation with the identification information of each member that is encrypted with the common encrypting key.

The processing information decrypting section 350 reads the processing information of each member and his or her identification information that is encrypted with the common encrypting key from the matching information temporary storing section 320 and decodes the processing information of each member with the private key read out from the decrypting key storing section 330. Then, the processing information decrypting section 350 passes the processing information of each member to the processing section 370 in relation with the respective members' identification information that are encrypted with the common encrypting key. The processing section 370 processes the matching result of each member received from the matching performing section 360 in a state in which the matching result is decrypted by only computers for persons concerned 100a based on the decrypted processing information of each member.

That is, the processing section 370 according to the present invention encrypts the matching result of each member with the same private key as that kept in his or her computer for a user. Then, the processing section 370 stores the processed matching result in the matching result storing section 380 in relation with his or her identification information that is encrypted with the common encrypting key for each member. FIG. 9b) shows an example of a list of the matching result that is stored in the matching result storing section 380. Here, $K_{EY}$ indicates the private key of a member Y. The sending section 390 sends the set of the matching result information including his or her identification information that is encrypted with the common encrypting key and the processed his or her matching result that are read out from the matching result storing section 380 to the mediating computer 200a.

Figure 10:
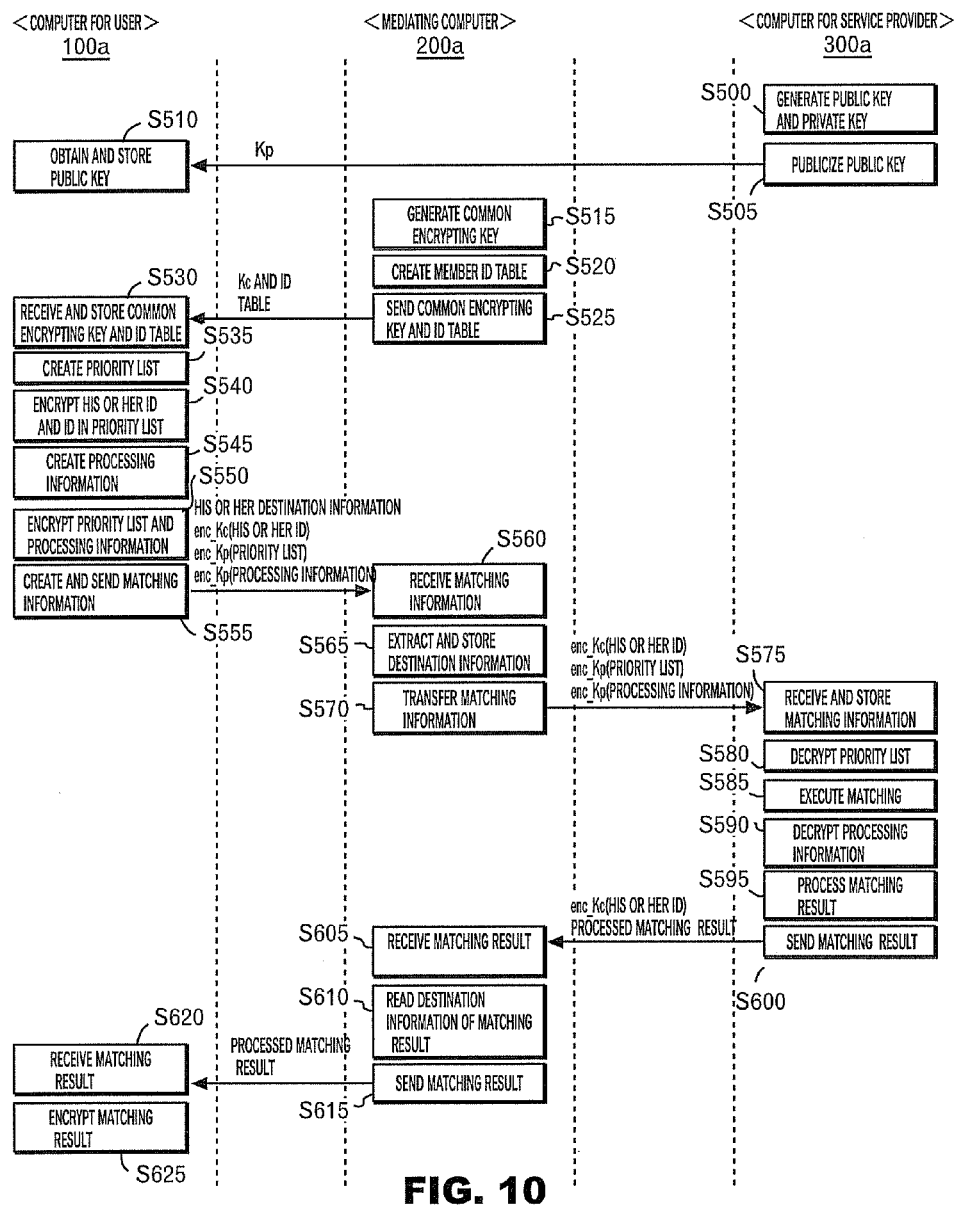
FIG. 10 is a diagram showing a flowchart showing an example of a flow of processes provided by the matching service according to the first embodiment to the third embodiment.

Now, an example of a flow of providing a matching service according to the first embodiment will be described with reference to a flowchart of FIG. 10. First, the computer for a service provider 300a generates a set of keys of a public key $K_P$ and a private key $K_S$ (step 500), and publicize the public key $K_P$ on the home page or the like (step 505). Here, the private key $K_S$ is stored in the decrypting key storing section 330 of the computer for a service provider 300a. The computer for a user 100a obtains the public key $K_P$ by downloading it from the home page of the computer for a service provider 300a or the like and stores it in the encrypting key storage area 125 of the computer for a user 100a (step 510).

The computer for a coordinating user 100a generates the common encrypting key $K_C$ that is common to all members (step 515), and creates an identification table indicating relationship between the members and their identification information IDs (step 520). Then, the computer for a coordinating user 100a sends the common encrypting key $K_C$ and the identification table to a computer for a user 100a of each member (step 525). Here, it is assumed that the computer for a coordinating user 100a plays a role of the mediating computer 200a. The computer for a user 100a receives the identification table and the common encrypting key $K_C$ and stores them in the common encrypting key storage area 120 and the identification table storage area 115, respectively (step 530).

The computer for a user 100a creates the priority list in which identification information IDs of the counterpart members are permuted in the priority list of the user by using the priority information read out from the priority information temporary storage area 110 and the identification table read out from the identification table storage area 115 (step 535). Then, the computer for a user 100a encrypts the identification information ID in the priority list and the identification information ID of the user with the common encrypting key $K_C$ read out from the common encrypting key storage area 120 (step 540).

The computer for a user 100a reads out the encrypting key of the computer for a user 100a from the processing key storage area 130 and makes the copy of the encrypting key as the processing information (step 545). Then, the computer for a user 100a encrypts the priority list and the processing information with the public key $K_P$ of the service provider read out from the encrypting key storage area 125 (step 550). Finally, the computer for a user 100a reads out the destination information of the user from the destination information storage area 135, creates a set of matching information with his or her identification information ID that is encrypted with the common encrypting key $K_C$, the priority list that is encrypted with the private key $K_P$ of the service provider, and the processing information that is also encrypted with the public key $K_P$ of the service provider, and sends the set to the mediating computer 200a (step 555).

The mediating computer 200a receives the set of matching information from the computer for a user of each member 100a (step 560). Then, the mediating computer 200a extracts destination information from the received set of matching information of each member and stores the destination information in the destination information storing section 220 in relation with his or her identification information ID that is encrypted with the common encrypting key $K_C$ included in the same set of matching information (step 565). Finally, the mediating computer 200a sends each set of matching information from which the destination information is extracted to the computer for a service provider 300a (step 570).

The computer for a service provider 300a receives the set of matching information of each member and stores it in the matching information temporary storing section 320 (step 575). Next, the computer for a service provider 300a decrypts the priority list of each member with the private key $K_S$ of the service provider that is read out from the decrypting key storing section 330 (step 580). Then, the computer for a service provider 300a performs the matching between the two groups based on his or her identification information ID and the decrypted priority list, while keeping his or her identification information ID and the identification information ID of members of the counterpart group in the priority list as encrypted with the common encrypting key $K_C$ (step 585).

The identification information ID of the counterpart, which is the matching result, is obtained as encrypted with the common encrypting key $K_C$ as mentioned above.

The computer for a service provider 300a also decrypts the processing information of each member with the private key $K_S$ of the service provider that is read out from the decrypting key storing section 330 and obtains the encrypting key of the member (step 590). Then, the computer for a service provider 300a encrypts the matching result of each member with the encrypting key of the member and processes the matching result so that it can only be decrypted by himself or herself (step 595). Finally, the computer for a service provider 300a sends a set of matching information including his or her identification information ID that is encrypted with the common encrypting key $K_C$ and the processed matching result to the mediating computer 200a (step 600).

The mediating computer 200a receives the set of matching result information of each member (step 605). Then, the mediating computer 200a reads the address of the matching result from the destination information storing section 220 by using his or her identification information ID that is encrypted with the common encrypting key $K_C$ included in the same set as the matching result as an index (step 610), and sends the matching result to a computer for a user 100a having the read destination information (step 615).

The computer for a user 100a receives his or her matching result (step 620). Then, the computer for a user 100a finally obtains the identification information ID of the counterpart, which is the matching result, by decrypting the matching result with the private key read out from the processing key storage area 130 and further decrypting the result with the common encrypting key $K_C$ read out from the common encrypting key storage area 120 (step 625).

As mentioned above, in the first embodiment, the identification information of members of the counterpart group in the priority list and his or her identification information are used for matching in the computer for a service provider as it is encrypted with the common encrypting key that is common to the members. Therefore, the identification information of the counterpart, which is the matching result, is also obtained as encrypted with the common encrypting key. Therefore, even if relationship between the members and their identification information is leaked outside, neither the contents of the priority list nor the matching result is known to the service provider or a third party. In the first embodiment, it is described that the processing information is a copy of the encrypting key kept in the computer for a user 100a and is for encrypting the matching result by using the private key encrypting method. The processing information may be a decrypting key kept in the computer for a user 100a and the processing information may be an encrypting key corresponding to the decrypting key. That is, the matching result may be encrypted by using a public key encrypting method.

Second Embodiment

Providing of the matching service according to the second embodiment and the third embodiment to be described later is basically the same as providing of the service according to the first embodiment except for the contents of the processing information and the processing key. Then, configurations and operations different from those in the matching service according to the first embodiment will be described in the second embodiment and the third embodiment to be described later.

First, the processing key, the contents of the processing information and a method for creating the processing information according to the second embodiment will be described with reference to FIG. 4. The processing key that is stored in the processing information storing area 130 of the computer for a user 100a according to the second embodiment is a key that is only kept in the computer for a user 100a of the user, which is an encrypting key in the private key encrypting method by which encryption and decryption are performed by the same key. The processing information creating section 150 creates an encrypted list as the processing information by encrypting the identification information of each member in the other group read out from the identification table storage area 115 with the encrypting key as a processing key and permuting the information according to the priority order of each member read out from the priority information temporary storage area 110. FIG. 11 shows an example of the processing information of the member A according to the embodiment. FIG. 11a) shows the priority list of the member A, and FIG. 11b) shows an example of the processing information of the member A. Here, $K_{EA}$ represents the encrypting key of the member A. In the second embodiment, the priority information stored in the priority information temporary storage area 110 is deleted from the computer for a user 100a after the processing information is created.

Now, how the processing information is treated in the computer for a user 100a and the computer for a service provider 300a after the processing information is created will be described with reference to FIG. 10. The encrypted list created by the processing information creating section 150 of the computer for a user 100a is encrypted with the public key $K_P$ of the service provider by the second encrypting section 155 (step 550), and sent to the computer for a service provider 300a via the mediating computer 200a as a piece of matching information (step 555, step 570). In the second embodiment, the common encrypting key $K_C$ of the common encrypting key storing area 120 is deleted from the computer for a user 100a after step 540.

The encrypted list of each member that is received by the computer for a service provider 300a is decrypted with the private key $K_S$ of the service provider by the processing information decrypting section 350 (step 590), and passed to the processing section 370 in relation with his or her identification information ID that is encrypted with the common encrypting key $K_C$. The matching performing section 360 according to the embodiment passes his or her identification information ID that is encrypted with the common encrypting key $K_C$ and the order of the counterpart member who makes a pair with him or her in his or her priority list to the processing section 370 as the matching result. The processing section 370 processes the matching result in a state in which the result is decrypted by only a computer for a person concerned by fetching the identification information of the counterpart member that is placed at the same order as that of the counterpart member who makes a pair with him or her in his or her priority list from his or her encrypted list for each member. Then, the processing section 370 stores the fetched identification information of the counterpart member in the matching result storing section 380 in relation with his or her identification information that is encrypted with the common encrypting key $K_C$ (step 595).

Processing of the matching performing section 360 and the processing section 370 will be detailed by taking the member A as an example. It is assumed that the matching performing section 360 obtains enc_$K_C$ (ID$_G$) as the other half of a pair with enc_$K_C$ (ID$_A$) as a result of the matching. Then, the matching performing section 360 reads out the order of enc_$K_C$ (ID$_G$), i.e., the order 2 from the priority list of the member A shown in FIG. 7d). The processing section 370 receives the order 2 from the matching performing section 360, and fetches information placed at the order 2, i.e., enc_$K_{EA}$ ($ID_G$) from the processing information of the member A shown in FIG. 11b). Then, the processing section 370 stores enc_$K_{EA}$ ($ID_G$) in the matching result storing section 380 in relation with enc_$K_C$ ($ID_A$). As such, the identification information of the counterpart member fetched from his or her encrypted list is encrypted with the encrypting key that is kept in his or her computer for a user 100a.

The sending section 390 sends a set of matching result information including his or her identification information ID that is encrypted with the common encrypting key $K_C$ and the identification information ID of the counterpart member who makes a pair with him or her that is encrypted with the encrypting key that is kept in his or her computer for a user 100a to the computer for a user 100a via the mediating computer 200a (step 600, step 615). The receiving section 102 of the computer for a user 100a receives the matching result (step 620) and passes the received matching result to the decrypting section 170. The decrypting section 170 finally obtains the identification information ID of the counterpart member by decrypting the matching result with the decrypting key of the computer for a user 100a that is read out from the processing key storing area 130 (step 625).

As mentioned above, in the second embodiment, the identification information of all members in the other group, which can be a matching result, is sent to the computer for a service provider 300a after encrypted with the encrypting key of the user in the computer for a user 100a. For that reason, the encrypting key of the computer for a user 100a needs not to be sent to the computer for a service provider 300a. As the matching result needs not to be encrypted in the computer for a service provider 300a, the common encrypting key is not used in encrypting the matching result. Accordingly, as the common encrypting key needs not to be kept in the computer for a user 100a for decrypting the matching result, the common encrypting key can be deleted after the matching information is created. In other words, the computer for a user 100a needs not to manage the common encrypting key. That means, with the common encrypting key, security of the matching service for keeping confidentiality of the contents of the priority list or the matching result is further enhanced.

Third Embodiment

As mentioned above, only configurations and operations different from those in providing a matching service according to the first embodiment will be described here. First, the processing key, the contents of the processing information and a method for creating the processing information according to the third embodiment will be described with reference to FIG. 4.

The processing key that is stored in the processing key storing area 130 of the computer for a user 100a according to the third embodiment is an encrypting key corresponding to the decrypting key that is kept in the computer for a user 100a of each member in the other group and a decrypting key that is kept in his or her computer for a user 100a. In the embodiment, a decrypting key that is kept in the computer for a user 100a of each member in the other group and him or her respectively is a private key in the public key encrypting method, and an encrypting key of each member in the other group that is stored in the processing key storage area 130 is a public key corresponding to the private key of each member. The processing information creating section 150 creates an encrypted list as the processing information by encrypting his or her identification information read out from the identification table storage area 115 with the public key of each member in the other group read out from the processing key storage area 130 and permuting it according to the priority information of the member read out from the priority information temporary storage area 110. FIG. 12 shows an example of the processing information of the member A according to the embodiment. FIG. 12a) shows the priority list of the member A, and FIG. 12b) shows an example of the processing information of the member A. Here, $K_{pY}$ represents the public key of the member Y. In the third embodiment, the priority information stored in the priority information temporary storage area 110 is deleted from the computer for a user 100a after the processing information is created.

Now, how the processing information is treated in the computer for a user 100a and the computer for a service provider 300a after the processing information is created will be described with reference to FIG. 10. The encrypted list created by the processing information creating section 150 is encrypted with the public key $K_p$ of the service provider by the second encrypting section 155 (step 550), and sent to the computer for a service provider 300a via the mediating computer 200a as a piece of matching information (step 555, step 570). In the third embodiment, the common encrypting key $K_C$ of the common encrypting key storing area 120 is deleted from the computer for a user 100a after step 540.

The encrypted list of each member that is received by the computer for a service provider 300a is decrypted with the private key $K_S$ of the service provider by the processing information decrypting section 350 (step 590), and passed to the processing section 370 in relation with his or her identification information ID that is encrypted with the common encrypting key $K_C$. The matching performing section 360 according to the embodiment passes the order of the counterpart member who makes a pair with him or her in his or her priority list and the identification information ID of the counterpart member that is encrypted with the common encrypting key $K_C$ to the processing section 370 in relation with his or her identification information ID that is encrypted with the common encrypting key $K_C$ as the matching result. The processing section 370 processes the matching result in a state in which the result is decrypted by only a computer for a person concerned by fetching his or her identification information that is placed at the same order as that of the counterpart member who makes a pair with him or her in his or her priority list from his or her encrypted list for each member. Then, the processing section 370 stores the fetched his or her identification information in the matching result storing section 380 in relation with the identification information of the counterpart member that is encrypted with the common encrypting key $K_C$ (step 595).

Processing of the matching performing section 360 and the processing section 370 will be detailed by taking the member A as an example. It is assumed that the matching performing section 360 obtains enc_$K_C$ ($ID_G$) as the other half of a pair with enc_$K_C$ ($ID_A$) as a result of the matching. Then, the matching performing section 360 reads out the order of enc_$K_C$ ($ID_G$), i.e., the order 2 from the priority list of the member A shown in FIG. 7d). The processing section 370 receives the order 2 from the matching performing section 360, and fetches information placed at the order 2, i.e., enc_$K_{PG}$ ($ID_A$) from the processing information of the member A shown in FIG. 12b). Then, the processing section 370 stores enc_$K_{PG}$ ($ID_A$) in the matching result storing section 380 in relation with enc_$K_C$ ($ID_G$). As such, his or her identification information fetched from his or her encrypted list is encrypted with the public key corresponding to the private key that is kept in the computer for a user 100a of the counterpart member.

The sending section 390 sends a set of matching result information including his or her identification information ID that is encrypted with the common encrypting key $K_C$ and the identification information ID of the counterpart member who makes a pair with him or her that is encrypted with the public key corresponding to the private key that is kept in his or her computer for a user 100a to the computer for a user 100a via the mediating computer 200a (step 600, step 615). The receiving section 102 of the computer for a user 100a receives the matching result (step 620) and passes the received matching result to the decrypting section 170. The decrypting section 170 finally obtains the identification information ID of the counterpart member by decrypting the matching result with the private key of the computer for a user 100a that is read out from the processing key storing area 130 (step 630).

As mentioned above, in the third embodiment, self identification information, which can be a matching result to the members in the other group, is sent to the computer for a service provider 300a after previously encrypted with the encrypting key corresponding to the decrypting key that is kept by the counterpart in the computer for a user 100a. For that reason, the encrypting key of the computer for a user 100a needs not to be sent to the computer for a service provider 300a. As the matching result needs not to be encrypted in the computer for a service provider 300a, the common encrypting key is not used in encrypting the matching result. Accordingly, as the common encrypting key needs not to be kept in the computer for a user 100a for decrypting the matching result, the common encrypting key can be deleted after the matching information is created. In other words, the computer for a user 100a needs not to manage the common encrypting key. That means, with the common encrypting key, security of the matching service for keeping confidentiality of the contents of the priority list or the matching result is further enhanced.

Fourth Embodiment

Figure 13:
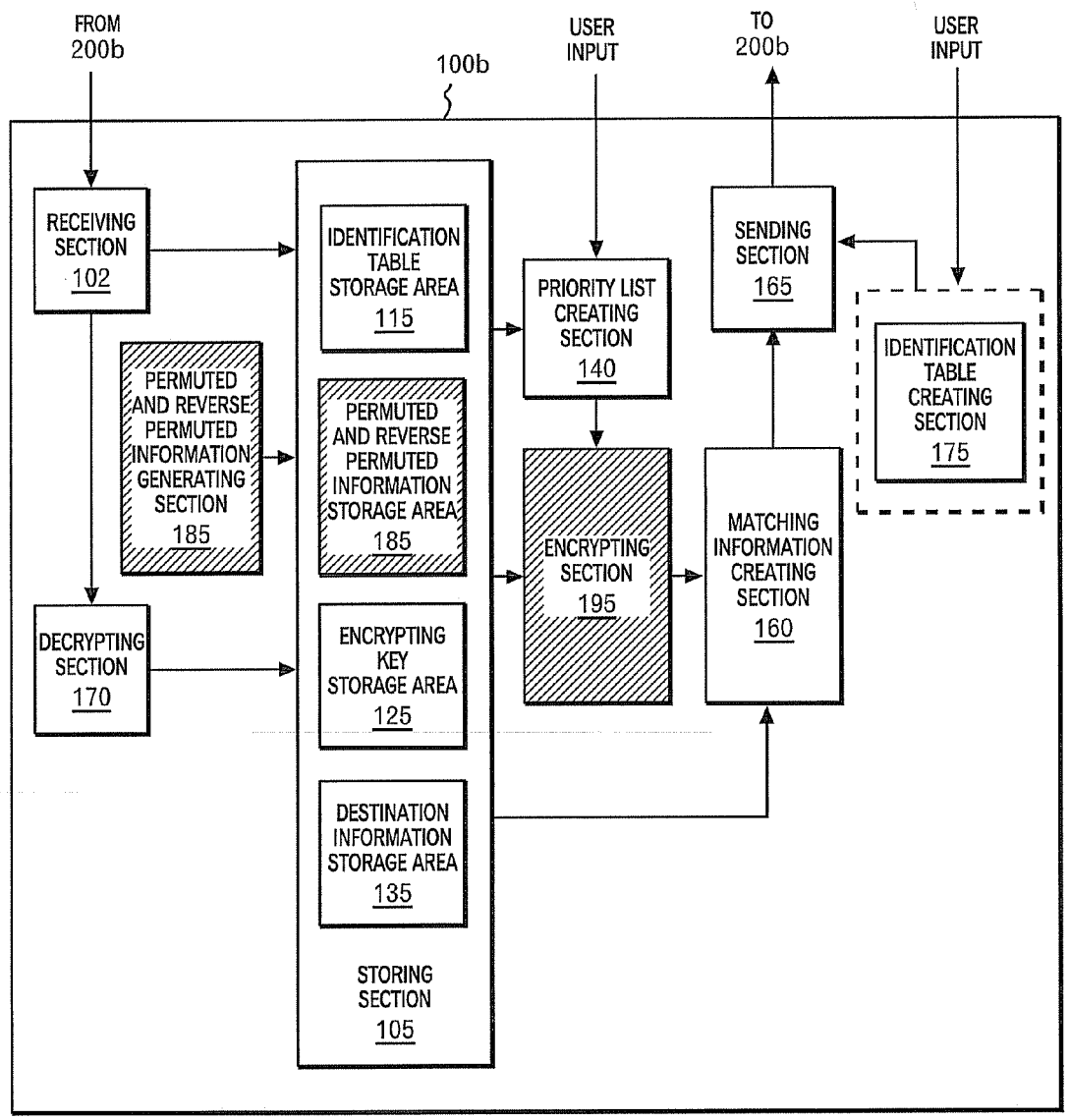
FIG. 13 shows an example of a functional configuration of the computer for a user 100b according to the fourth embodiment.

Unlike in the first embodiment to the third embodiment, the identification information of each member is encrypted in the mediating computer 200a in the fourth embodiment. Therefore, the computer for a user 100a encrypts the priority list such that the mediating computer 200a can access the identification information in the priority list. FIG. 13 shows a functional configuration of the computer for a user 100b according to the fourth embodiment. As shown in FIG. 13, the computer for a user 100b according to the fourth embodiment does not include the priority information temporary storage area 110, the a common encrypting key storage area 120, and the first encrypting section shown in FIG. 4. The computer for a user 100b according to the embodiment includes a permuting/inverse permuting information generating section 185 in place of the processing information creating section 150 shown in FIG. 4, a permuting/inverse permuting information storing area 190 in place of the processing key storage area 130 shown in FIG. 4, and an encrypting section 195 in place of the second encrypting section 155 shown in FIG. 4.

As such, in the fourth embodiment, the program for a user stored in the hard disk of the hard disk drive 440 is loaded in the RAM 410 by the operation of the operating system in response to the user's operation. The program causes the computer for a user 100b to function as the receiving section 102, the storing section 105, the priority list creating section 140, the permuting/inverse permuting information generating section 185, the encrypting section 195, the matching information creating section 160, the sending section 165 and the decrypting section 170 by issuing a command to the CPU 440 or the other peripheral devices with such an operation as to call a predetermined API routine of the operating system. The storing section 105 includes the identification table storage area 115, the encrypting key storage area 125, the permuting/inverse permuting information storing area 190 and the destination information storage area 135. Although the storing areas are shown as in the same storing section 105 in FIG. 13 for convenience, they may actually be areas present in a plurality of physically separated storing devices such as the HDD 440, the FD drive 480 and the like.

In the embodiment, a member who selected as a coordinator of the two groups allocates the identification information to each member. Then, the program for a user of the coordinator further causes the computer for a user 100b as the identification table creating section 175. As the identification table storage area 115, the encrypting key storage area 125, and the destination information storage area 135 in the computer for a user 100b as well as the identification table creating section 175 are the same as those in the first embodiment to the third embodiment, they will be omitted from the description here. The encrypting key of the service provider that is stored in the encrypting key storage area 125 is a public key of a service provider also in the embodiment.

The priority list creating section 140 creates the priority list in which the identification information of the counterpart member is permuted in the user's priority order by using the priority information of members in the other group that is entered from the user, who is a user of the computer for a user 100b, via an input device such as a keyboard or the like and the identification table indicating relationship between members and the members' identification information read out from the identification table storage area 115. The permuting/inverse permuting information generating section 185 generates permuting information for permuting the priority order in the priority list and inverse permuting information for recovering the original order of the list that is permuted according to the permuting information. FIG. 14 shows an example of permuting/inverse permuting information for a group consisting of four members. FIG. 14a) is permuting information of the member A and FIG. 14b) is inverse permuting information of the member A. The permuting information may be any information if only it can sort the order. There are a plurality of algorithms for randomly permuting elements, such as random_shuffle( ) prepared in the standard template library of the C language. In the present invention, such an existing algorithm may be used, or a user directly input a permuting method via an input device such as a keyboard. The generated permuting/inverse permuting information is stored in the permuting/inverse permuting information storing area 190.

The encrypting section 195 receives the priority list and his or her identification information from the priority list creating section 140. Next, the encrypting section 195 sorts the order of the identification information of members in the other group on the priority list according to the permuting information that is read out from the permuting/inverse permuting information storing area 190. Here, permuting of the identification information in the priority list will be detailed by using the permuting information shown in FIG. 14a). FIG. 14c) shows an example of the priority list of the member A, where members E, F, G and H belongs to the other group which is shown from the viewpoint of the member A. If the order of the priority list is permuted according to the permuting information shown in FIG. 14a), it will be as shown in FIG. 14*d*). The encrypting section 195 reads out the public key of the service provider from the encrypting key storage area 125, and encrypts the inverse permuting information read out from the permuting/inverse permuting information storing area 190 with the public key. Finally, the encrypting section 195 passes his or her identification information of a user, a priority list in which the identification information of members in the other group is permuted, and an encrypted inverse permuting information to the matching information creating section 160.

The matching information creating section 160 creates a set of matching information by combining his or her destination information of a user read out from the destination information storage area 135 with the data passed from the an encrypting section 195. The sending section 165 sends the set of matching information passed from the matching information creating section 160 to the mediating computer 200.

The receiving section 102 receives a result list of the identification information of members in the other group that is created so that the identification information of the counterpart member, which is the matching result, is placed at the order that is previously determined between a service provider and a user. In the result list, the identification information is permuted according to his or her inverse permuting information of the user. The decrypting section 170 sorts the identification information in the result list passed from the receiving section 102 according to the permuting information read out from the permuting/inverse permuting information storing area 190. Finally, the decrypting section 170 obtains the matching result by fetching the identification information of members in the other group that is placed at the predetermined order from the result list in which the order is recovered. Here, decryption by the decrypting section 170 will be detailed by using the abovementioned example of the member A. It is assumed that the receiving section 102 receives the result list shown in FIG. 15*a*). The identification information in the result list has been decrypted in the mediating computer 200*b*. That will be described with reference to FIG. 16. The decrypting section 170 sorts the identification information in the result list according to the permuting information of the member A shown in FIG. 14*a*). As a result of the permuting, the decrypting section 170 obtains the result list shown in FIG. 15*b*). The decrypting section 170 fetches $ID_G$ that is placed at the order 1 as the counterpart who makes a pair with the member A, where the place previously determined between the user and the service provider is the order 1.

Figure 16:
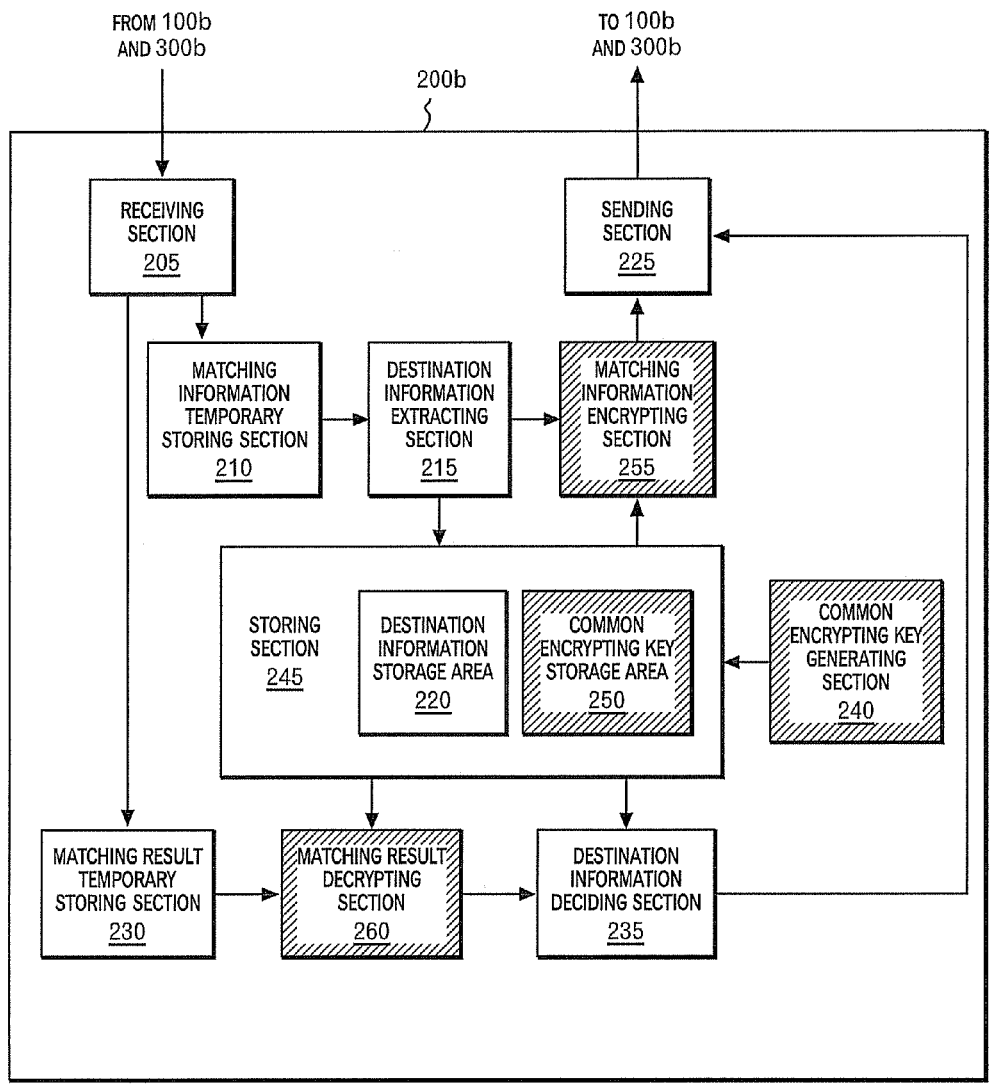
FIG. 16 is a diagram showing an example of a functional configuration of the mediating computer according to the fourth embodiment.

With reference to FIG. 16, a functional configuration of the mediating computer 200*b* according to the fourth embodiment will be described. As shown in FIG. 16, the mediating computer 200*b* according to the fourth embodiment includes a common encrypting key generating section 240, a common encrypting key storing area 250, a matching information encrypting section 255, and a matching result decrypting section 260 in addition to a functional configuration of the mediating computer 200*a* shown in FIG. 5. In the fourth embodiment, the mediating program stored in the hard disk of the hard disk drive 440 is loaded on the RAM 410 under the operating system's operation in response to the user's operation, issues a command to the CPU 400 or the other peripheral devices by such a process of the program to call a predetermined API routine of the operating system and causes the mediating computer 200*b* to function as the receiving section 205, the matching information temporary storing section 210, an destination information extracting section 215, a storing section 245, the common encrypting key generating section 240, the matching information encrypting section 255, the sending section 225, the matching result temporary storing section 230, the matching result decrypting section 260 and the destination information deciding section 235. The storing section 245 includes the destination information storage section 220 and the common encrypting key storing area 250. As each of the storing sections, the HDD 440 can be used as an example. Although the destination information storage section 220 and the common encrypting key storing area 250 are shown as in the same storing section 245 for convenience in FIG. 16, they may actually be areas present in a plurality of physically separated storage devices. Hereinafter, newly added components will be mainly described. Also in the fourth embodiment, as the mediating computer 200*b* is for coordinating the destination information of a service user, while hiding the destination information of a service user from the service provider, it is preferably realized by the computer for a service provider who is selected as a coordinator.

The receiving section 205 receives a set of matching information from each computer for a user 100*b*. The set of matching information received by the mediating computer 200*b* includes his or her destination information, his or her identification information, a priority list in which the identification information of members in the other group that is permuted in his or her priority order is permuted according to the permuting information that is kept by him or her, and inverse permuting information that is encrypted with an encrypting key of a service provider. The destination information extracting section 215 extracts his or her destination information from the set of matching information that is read out from the matching information temporary storing section 210, and stores it in the destination information storing section 220 in relation with his or her identification information.

The common encrypting key generating section 240 generates the common encrypting key that is common to all members of two groups. As the generated common encrypting key is the same as the common encrypting key that is generated by the common encrypting key generating section 180 of FIG. 4, they will be omitted from the description here. The common encrypting key storing area 250 stores the common encrypting key generated by the common encrypting key generating section 240. The matching information encrypting section 255 receives the set of matching information of each member, from which destination information is extracted, from the destination information extracting section 215 and fetches his or her identification information and the priority list. Then, the matching information encrypting section 255 encrypts the identification information of members in the priority list and his or her identification list with the common encrypting key that is read out form the common encrypting key storing area 250. The encryption by the matching information encrypting section 255 will be detailed by using the abovementioned example of the member A. The matching information encrypting section 255 encrypts the identification information on the list with the common encrypting key $K_C$ for the priority list of the member A after the received identification information shown in FIG. 14*d*) is permuted. Accordingly, the matching information encrypting section 255 obtains the priority list shown in FIG. 14*e*).

The sending section 225 receives the processed set of matching information of each member, i.e., his or her identification information that is encrypted with the common encrypting key, a priority list in which the identification information of members in the other group is encrypted with the common encrypting key, and inverse permuting information that is encrypted with an encrypting key of the service provider from the matching information encrypting section 255, and sends it to the computer for a service provider 300*b*.

The receiving section 205 further receives a set of matching result information of the result list of his or her identification information that is encrypted with the common encrypting key and the identification information for members in the other group that is created so that the identification information of the counterpart member who makes a pair with him or her is placed at a predetermined order, where the identification information is further permuted based on his or her inverse permuting information, for each member from the computer for a service provider 300b.

The matching result decrypting section 260 receives the set of matching result from the matching result temporary storing section 230, and fetches his or her identification information and the result list. Then, the matching result decrypting section 260 decrypts his or her identification information and the identification information of members in the result list with the common encrypting key that is read out from the common encrypting key storing area 250. Here, decryption by the matching result decrypting section 260 will be detailed by using the abovementioned example of the member A. It is assumed that the matching result decrypting section 260 receives the result list shown in FIG. 15d). The identification information in the result list is permuted in the computer for a service provider 300b. That will be described later with reference to FIG. 17. The matching result decrypting section 260 decrypts the identification information in the list with the common encrypting key for the result list shown in FIG. 15d). As a result, the matching information encrypting section 255 obtains the result list shown in FIG. 15a). The destination information deciding section 235 reads out an address of the result list from the destination information storing section 220 by using his or her identification information ID included in the set of matching result information that is the same as the result list as an index. The sending section 225 sends the processed matching result to a computer for a user 100b having the destination information read out by the destination information deciding section 235.

Figure 17:
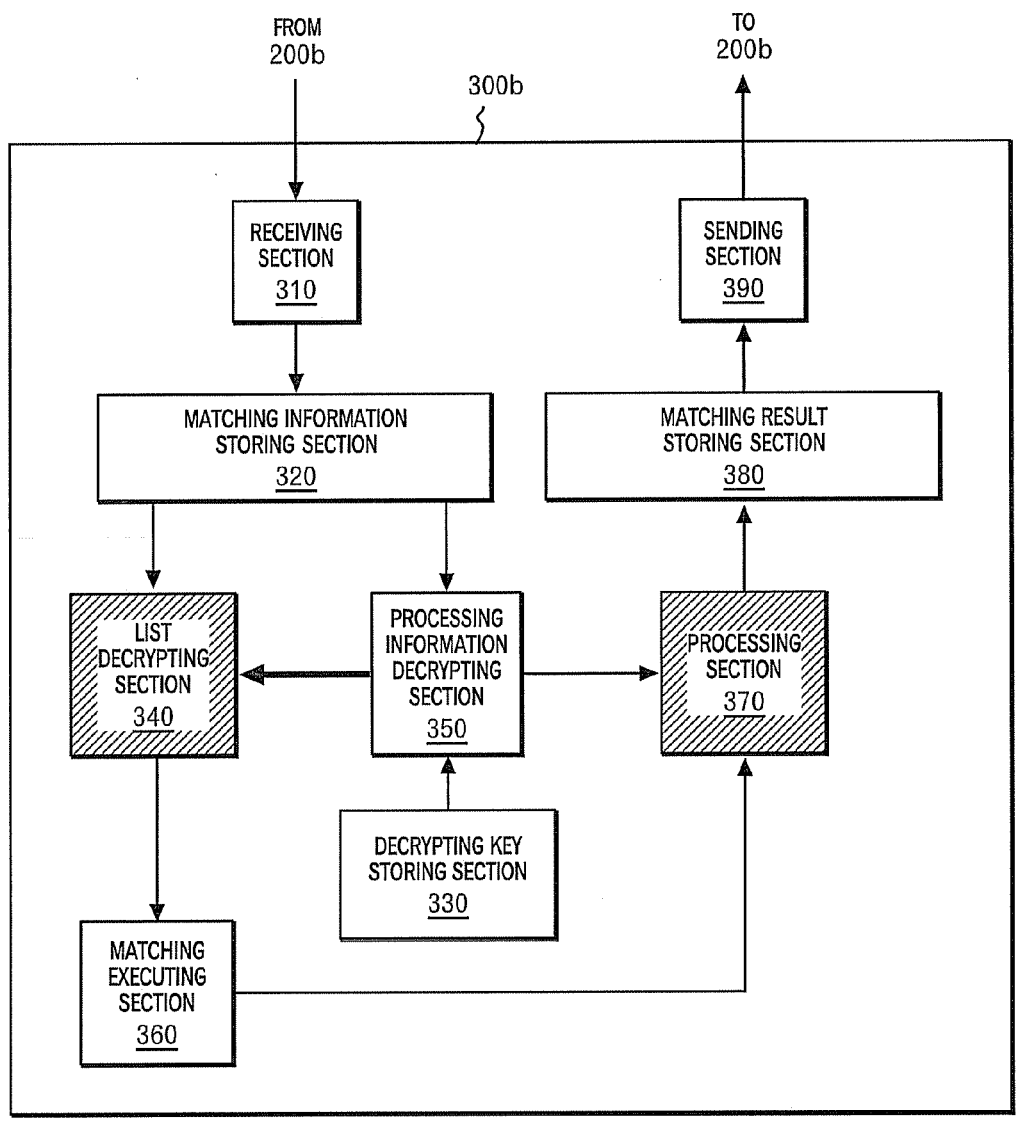
FIG. 17 is a diagram showing an example of a functional configuration of the computer for a service provider according to the fourth embodiment.

FIG. 17 shows a functional configuration of the computer for a service provider 300b according to the fourth embodiment. As shown in FIG. 17, the components of the computer for a service provider 300b according to the fourth embodiment are the same as those of the computer for a service provider shown in FIG. 6. Accordingly, also in the fourth embodiment, the program for a service provider stored in the hard disk of the hard disk drive 440 is loaded on the RAM 410 under the operating system's operation in response to the user's operation, issues a command to the CPU 400 or the other peripheral devices by such a process of the program to call a predetermined API routine of the operating system and causes the computer for a service provider 300b to function as the receiving section 310, the matching information temporary storing section 320, the decrypting key storing section 330, the list decrypting section 340, the processing information decrypting section 350, the matching performing section 360, the processing section 370, the matching result storing section 380 and the sending section 390. As each of the above mentioned storing section, the HDD 440, for example, can be used.

Unlike in the first embodiment to the third embodiment, the priority order of the priority list received by the computer for a service provider 300b is permuted according to the permuting information that is only kept by the computer for a user of each member in the embodiment, however. The processing information for processing the matching result is inverse permuting information for recovering the original order of the priority list of each member. Therefore, the details of the list decrypting section 340 and the processing section 370 are different from those described with reference to FIG. 6. Here, the list decrypting section 340 and the processing section 370 will be mainly described.

The list decrypting section 340 according to the embodiment decrypts the priority list by recovering the original order of the priority order of the priority list of each member that is read out from the matching information temporary storing section 320 by permuting it based on the processing information that is decrypted with the public key of the service provider, read out from the decrypting key storing section 330 by the processing information decrypting section 350, i.e., the inverse permuting information of each member. The matching performing section 360 according to the embodiment passes the identification information of the counterpart member who makes a pair with him or her and the identification information of the rest member in the other group to the processing section 370 in relation with his or her identification information that is encrypted with the common encrypting key. Here, all the identification information of members in the other group is encrypted with the common encrypting key. The processing information decrypting section 350 passes his or her decrypted inverse permuting information to the processing section 370 in relation with his or her identification information that is encrypted with the common encrypting key.

The processing section 370 according to the embodiment creates the result list of the identification information of members in the other group that is encrypted with the common encrypting key so that the identification information of the counterpart member who makes a pair with him or her is placed at the position that is previously determined between the user and the service provider for each member. Then, the processing section 370 sorts the order of the identification information of the created result list of each member based on his or her inverse permuting information. Finally, the processing section 370 stores the result list in the matching result storing section 380 in relation with his or her identification information that is encrypted with the common encrypting key. Here, processing by the processing section 370 will be detailed by using the abovementioned example of the member A. It is assumed that the matching performing section 360 obtains enc_$K_C$ ($ID_G$) as the other half of a pair with enc_$K_C$ ($ID_A$) as a result of the matching. It is also assumed that the position previously determined between the user and the service provider is the order 1. Then, the processing section 370 creates the result list of the member A shown in FIG. 15c) by suitably permuting the identification information of the rest member in the other group with enc_$K_C$ ($ID_G$) being placed at the order 1. Next, the processing section 370 finally obtains the result list after the inverse permuting shown in FIG. 15d) by permuting the identification information in the result list based on the inverse permuting information of the member A shown in FIG. 14b).

Figure 18:
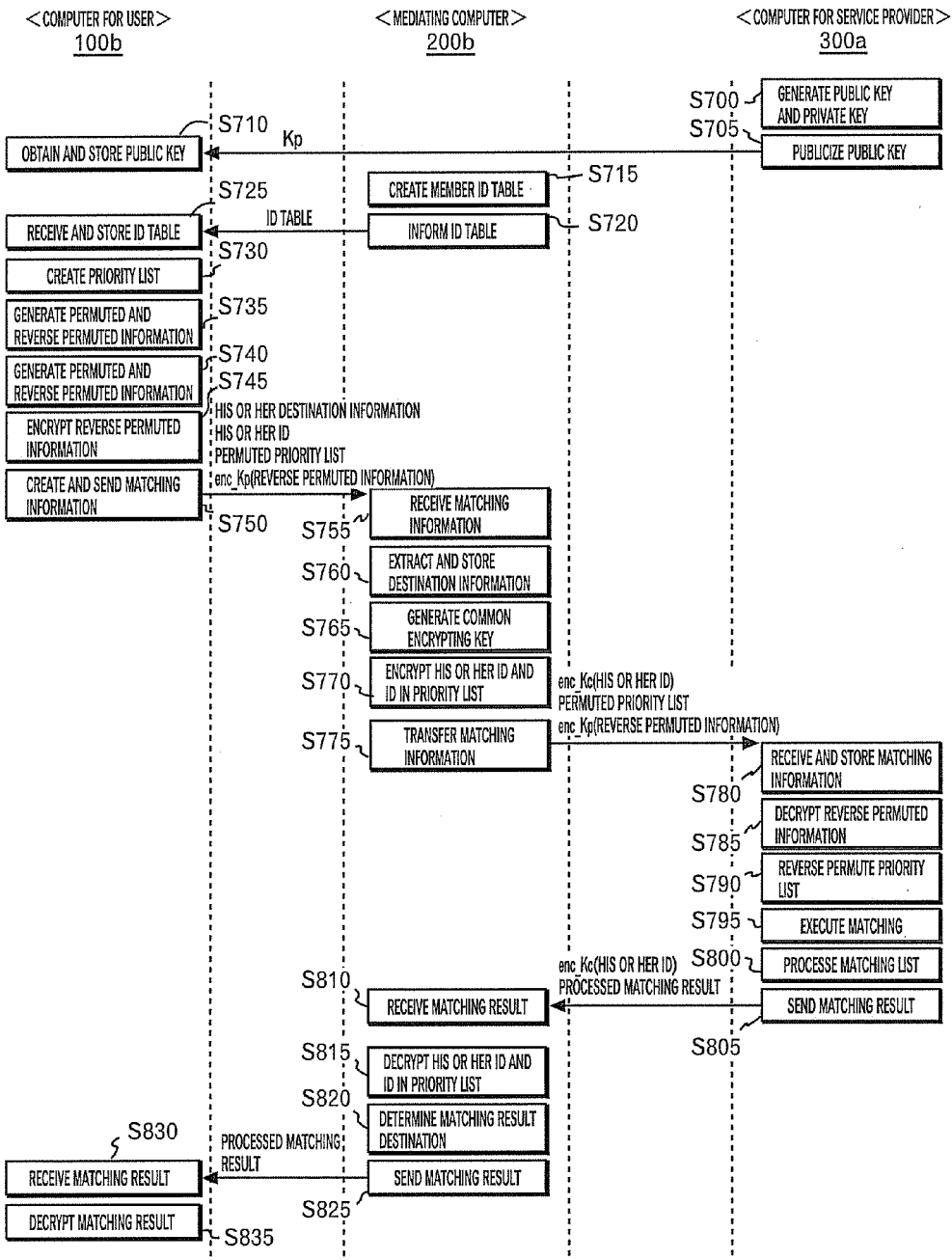
FIG. 18 is a diagram showing a flowchart showing an example of a flow of processes provided by the matching service according to the fourth embodiment.

Now, an example of processes of providing the matching service according to the fourth embodiment will be described with reference to the flowchart of FIG. 18. First, the computer for a service provider 300b generates a set of keys of the public key $K_P$ and the private key $K_S$ (step 700), and publicize the public key $K_P$ on the homepage or the like (step 705). Here, the private key $K_S$ is stored in the decrypting key storing section 330 of the computer of a service provider 300b. The computer for a user 100b of each member in the two groups who uses a service obtains the public key $K_P$ by such a manner as downloading it or the like and stores it in the encrypting key storing area 125 (step 710).

The computer for a coordinating user 100b creates the identification table showing relationship between members and the members' identification information IDs (step 715).

The computer for a coordinating user 100*b* sends the created identification table to the computer for a user 100*b* of each member (step 720). The computer for a user 100*b* of each member receives the identification table and stores it in the identification table storing area 115 (step 725). It is assumed that the computer for a coordinating user 100*b* plays a role as the mediating computer 200.

The computer for a user 100*b* obtains the priority information of members in the other group via an input device such as a keyboard from a user and creates the priority list in which the identification information ID of the counterpart member is permuted in the priority order of the user by using the identification table read out from the identification table storing area 115 (step 730). The computer for a user 100*b* generates the permuting information for permuting the priority order of the priority list and inverse permuting information for recovering the original order of the priority list based on the permuting information (step 735), and stores it in the permuting/inverse permuting information storing area 190. The computer for a user 100*b* sorts the priority order of the priority list according to the permuting information read out from the permuting/inverse permuting information storing area 190 (step 740).

The computer for a user 100*b* encrypts the public key $K_P$ of the service provider that is read out from the encrypting key storage area 125 (step 745). Finally, the computer for a user 100*b* reads out his or her destination information of a user from the destination information storage area 135, creates a set of matching information by putting the destination information together with the priority list in which the priority order is permuted and the inverse permuting information that is encrypted wit the public key $K_P$ of the service provider, and sends it to the mediating computer 200*b* (step 750).

The mediating computer 200*b* receives the set of the matching information from the computer for a user 100*b* of each member (step 755). Next, the mediating computer 200*b* extracts the received destination information from the set of matching information of each member and stores it in the destination information storing section 220 in relation with his or her identification information ID (step 760). The mediating computer 200*b* creates the common encrypting key $K_C$ (step 765), and stores it in the common encrypting key storage area 250. The mediating computer 200*b* encrypts his or her identification information ID and the identification information ID of members in the other group on the priority list with the common encrypting key $K_C$ that is read out from the common encrypting key storing area 250 for each of the received set of members (step 770). Finally, the mediating computer 200*b* sends the processed set of matching information of each member from which destination information is extracted to the computer for a service provider 300*b* (step 775).

The computer for a service provider 300*b* receives the set of matching information of each member and stores it in the decrypting key storing section 330 (step 780). The computer for a service provider 300*b* decrypts the inverse permuting information of each member with the private key $K_S$ of the service provider that is read out from the decrypting key storing section 330 (step 785). Then, the computer for a service provider 300*b* recovers the original order of the priority order of the priority list of each member based on the inverse permuting information of each member (step 790). Next, the computer for a service provider 300*b* performs matching between the two groups based on his or her identification information ID and the priority list for each member, while keeping his or her identification information ID and the identification information ID of members in the other group in the priority list as encrypted with the common encrypting key $K_C$ (step 795). The identification information ID of the counterpart who makes a pair with him or her, which is the matching result, is obtained as encrypted with the common encrypting key $K_C$.

The computer for a service provider 300*b* creates the result list of the identification information ID of members in the other group that is encrypted with the common encrypting key $K_C$ so that the identification information ID of the counterpart member who makes a pair with him or her is placed at a predetermined order. The computer for a service provider 300*b* processes the matching result by permuting the order of the identification information IDs in the created result list of each member based on the inverse permuting information of each member (step 800). Finally, the computer for a service provider 300*b* sends the set of matching result information including his or her identification information ID that is encrypted with the common encrypting key $K_C$ and processed his or her result list to the mediating computer 200*b* (step 805).

The mediating computer 200*b* receives the set of the matching result information of each member (step 810). The mediating computer 200*b* decrypts his or her identification information ID and the identification information ID of members in the other group on the result list with the common encrypting key $K_C$ that is read out from his or her identification information ID for each member (step 815). Then, the mediating computer 200*b* reads an address of the matching result of each member from the destination information storing section 220 by using his or her identification information ID included in the set of matching result information, which is the same as the abovementioned matching result, as an index (step 820) and sends the processed matching result to a computer for a user 100*b* having the read out destination information (step 825).

The computer for a user 100*b* receives his or her processed result list (step 830). Then, the computer for a user 100*b* sorts the order of the identification information IDs of members in the other group on the received result list according to the permuting information read out from the permuting/inverse permuting information storing area 190. The computer for a user 100*b* finally obtains the identification information of the counterpart who makes a pair with him or her, which is the matching result, by fetching the identification information of members who is placed at a predetermined order in the result list obtained in such a manner (step 835).

As mentioned above, according to the fourth embodiment, the identification information of members in the other group on the priority list is encrypted with the common encrypting key that is common to all the members in the mediating computer 200*b*. The identification information of the counterpart member, which is the matching result, is decrypted with the common encrypting key in the mediating computer 200*b*. As a result, in the fourth embodiment, the common encrypting key needs not to be distributed to the computer for a user 100*b* of all the members and the common encrypting key becomes more easily managed. That means that security of the matching service for keeping confidentiality of the contents of the priority list or the matching result is enhanced by using the common encrypting key.

Fifth Embodiment

In the fifth embodiment, the identification information of each member in the priority list is encrypted in the mediating computer 200*c* as in the fourth embodiment. Unlike the fourth embodiment, information that is prepared by the computer for a user 100c for the matching is sent to the computer for a service provider 300c via the plurality of mediating computers 200c in the fifth embodiment. Therefore, only one mediating computer 200c needs to be reliable in the fifth embodiment, while it is assumed that the mediating computer 200c need to be a reliable computer in the fourth embodiment. As information is sent via the plurality of mediating computers 200c, the identification information of each member in the priority list is converted to a different value in the computer for a user 100c for improving security in the fifth embodiment. The matching result is publicized after it is processed by the computer for a service provider 300c in a state in which the result is decrypted by only the computer for a person concerned 100c.

Figure 19:
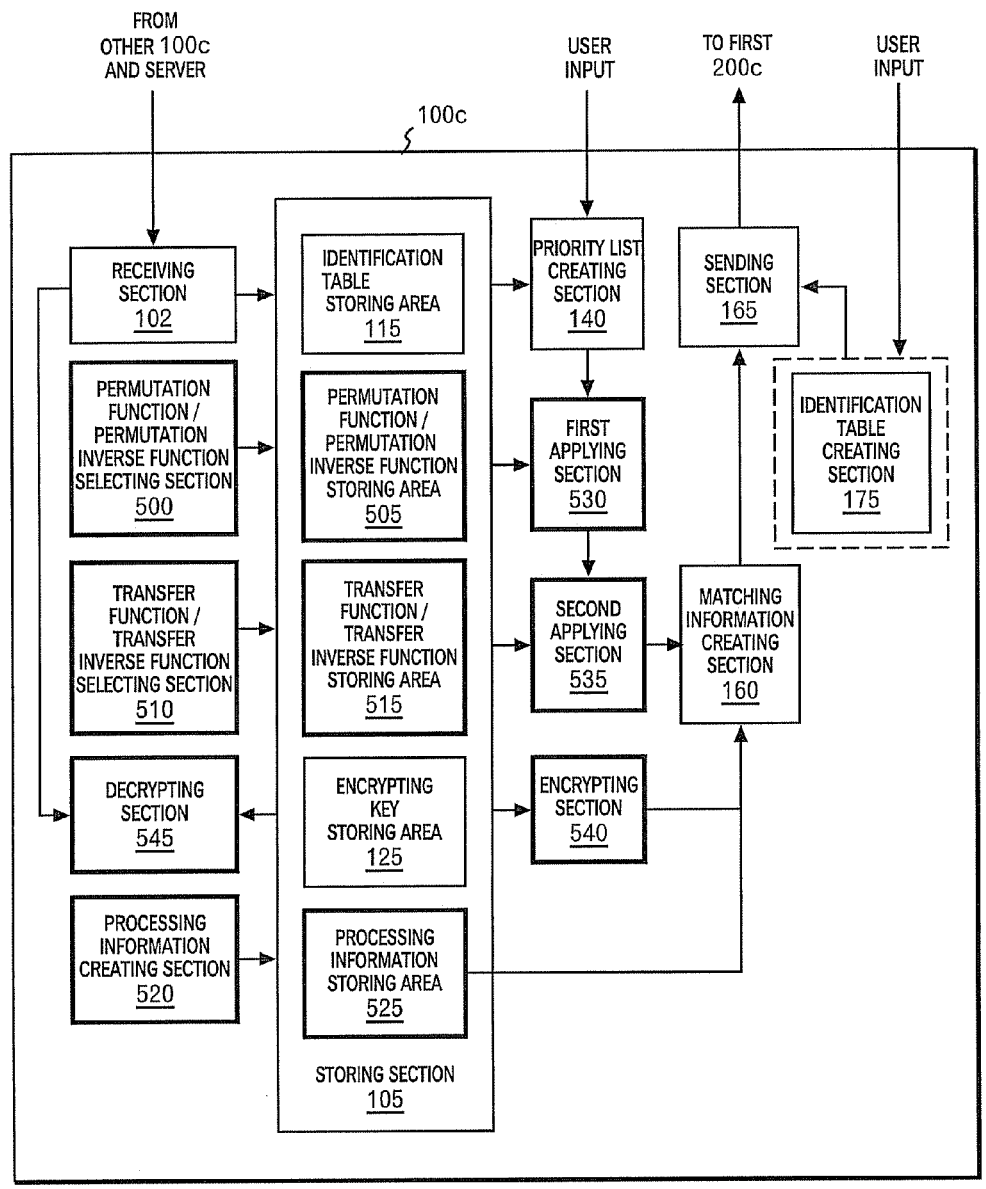
FIG. 19 is a diagram showing an example of a functional configuration of the computer for a user according to the fifth embodiment.

FIG. 19 shows a functional configuration of the computer for a user 100c according to the fifth embodiment. In the fifth embodiment, the program for a user that is stored in the hard disk of the hard disk drive 440 is loaded in the RAM 410 by an operation of the operating system in response to the user's operation. With the processing of the operating system such as to call a predetermined API routine, the program issues a command to the CPU 400 or the other peripheral devices and causes the computer for a user 100c to function as a receiving section 102, a storing section 105, a priority list creating section 140, a permuting function/permuting inverse function selecting section 500, a transfer function/transfer inverse function selecting section 510, a processing information creating section 520, a first applying section 530, a second applying section 535, an encrypting section 540, a matching information creating section 160, a sending section 165, and a decrypting section 545. The storing section 105 further includes an identification table storing area 115, a permuting function/permuting inverse function storing area 505, a transfer function/transfer inverse function storing area 515, an encrypting key storing area 125, and a processing information storing area 525. Although the storing areas are shown as in the same storing section 105 in FIG. 19 for convenience, they actually may be in a plurality of physically different storing devices such as the HDD 440, the FD drive 480 and the like.

In the embodiment, a member who is selected as a coordinator of the two groups allocates the identification information to each member. The program for a user of the coordinator further causes the computer for a user 100b as an identification table creating section 175. As the receiving section 102, the identification table creating section 175, the identification table storing area 115, the priority list creating section 140, the encrypting key storing area 125 and the matching information creating section 160 are basically the same as those described from the first embodiment to the fourth embodiment, they will be omitted from the description. It is assumed that a public key of a plurality of mediating computer is also stored in the encrypting key storing area 125 according to the present invention as well as the public key of the service provider. The identification information that is allocated to each member by the identification table creating section 175 according to the present invention is shown below. It is assumed that "p" and "q" are big prime numbers with "p−1" being a multiple of "q". It is also assumed that a root "q" of 1 in $Z_p^* = \{0, \ldots,\}$ is "g" (i.e., g≢−1 mod p). It is assumed that a group of heteromerous "q" where "g" is a generator as $Gq = \{1, g, g^2, \ldots g^{q-1}\}$. Here, the identification information S allocated to each member is the origin of Gq. In the description below, the number of persons participating in the matching is "n", and the number of the mediating computers 200c is "t".

The permuting function/permuting inverse function selecting section 500 selects a permuting function for permuting the priority order of the priority list and a permuting inverse function for recovering the original order of the list according to the permuting function. The permuting function $A_i$ may be any function if only it is a one-to-one mapping other than identity map. As mentioned above, a permuting function may be selected by using an existing algorithm or a user may directly input the permuting method via an input device such as a keyboard or the like. The selected permuting function $A_i$ and permuting inverse function $A_i^{-1}$ are stored in the permuting function/permuting inverse function storing area 505. Hereinafter, the result of applying the permuting function $A_i$ to the priority list $L_i$ is described as $A_i \Rightarrow L$.

The transfer function/transfer inverse function selecting section 510 selects a transfer function for transferring a value of identification information x of each member in the other group on the priority list $L_i = \langle x_1, \ldots, x_n \rangle$ into a different value and a transfer function for reversing transfer according to the transfer function. Any function may be used for the transfer function $B_i$ if only it can obtain the same result when it is exchanged with the transfer function $c_j(j=1-t)$, which is selected in each mediating computer 200c, in the order to be described later, i.e., if only it can establish $B_i c_j = c_j B_i$. As an example of the transfer function $B_i$, $B_i(x) = x^{k(i)}$ mod p is selected in the embodiment. Here, k(i) is an element of $Z_q = \{0, \ldots, q-1\}$. In this embodiment, the inverse transfer function $B_i^{-1} = x^{k(i)'}$ mod p. Here, k(i)=1/k(i) mod q. The selected transfer function $B_i$ and the transfer inverse function $B_i^{-1}$ are stored in the transfer function/transfer inverse function storing area 515. Hereinafter, the result in which the transfer function $B_i$ is applied to each identification information listed on the priority list is expressed as $B_i \Rightarrow L_i$, and the result in which the permuting function $A_i$ is applied to it is expressed as $A_i, B_i \Rightarrow L_i$.

The processing information creating section 520 creates the processing information used by the computer for a service provider 300c for processing the matching result in a state in which the result can be decrypted by only the computer for a person concerned 100c. The processing information may be an encrypting key in a private key encrypting method is encrypted with the public key of the computer for a service provider 300c. In the embodiment, as processing information for shuffling a set of matching information of each member to be described later, that described below will be used in the embodiment. The processing information includes two values to be $m_i^{(0)} = g$, $n_i^{(0)} = g^{v(i)}$ mod p. Here, "v" is an element of $Z_q = \{0, \ldots, q-1\}$. The created processing information $m_i^{(0)}$, $n_i^{(0)}$, p, g and v(i) are stored in the processing information storing area 525 and the processed information $m_i^{(0)}$, $n_i^{(0)}$ are passed to the matching information creating section 160. In the following explanation, a superscript with parentheses of a character such as $m_i$ and $n_i$ shows, in the case where the value of the superscript is 0, that the character was processed in the computer for the user 100c and, in the case where the value of the superscript is j, that the character was processed in the $j^{st}$ mediating computer 200c.

The first applying section 530 reads the permuting function $A_i$ stored in the permuting function/permuting inverse function storing area 505 and applies the permuting function $A_i$ to the priority list $L_i$ received from the priority list creating section 140. The priority list $A_i \Rightarrow L_i$ of the result is passed to the second applying section 535. The second applying section 535 reads the transfer function $B_i$ from the transfer function/transfer inverse function storing area 515 and applies the transfer function $B_i$ to the priority list $A_i \Rightarrow L_i$ received from the first applying section 530. The second applying section 535 also reads his or her identification information $x_i$ from the identification table storing area 115 and applies the transfer function $B_i$ to the identification information $x_i$. The priority list $L_i = A_i$, $B_i \Rightarrow L_i$ of the result and his or her identification information $I_i^{(0)} = B_i(x_i)$ are passed to the matching information creating section 160.

The encrypting section 540 encrypts the permuting inverse function $A_i^{-1}$ read out from the permuting function/permuting inverse function storing area 505 and the transfer inverse function $B_i^{-1}$ read out from the transfer function/transfer inverse function storing area 515 with the pubic key E(j) of each mediating computer 200c read out from the encrypting key storing area 120 and the public key E(Q) of the computer for a service provider 300c. The encryption is performed in the opposite order contrary to the order for each mediating computer 200c and the computer for a provider 300c to receive information from the computer for a user 100c. That is, the encrypting section 540 obtains $D_i^{(0)} = \text{enc\_K}_{E(1)}( \ldots (\text{enc\_K}_{E(t)}(\text{enc\_K}_{E(Q)}(A_i^{-1}))) \ldots )$ as a result of encryption of the permuting inverse function $A_i^{-1}$ and $E_i^{(0)} = \text{enc\_K}_{E(1)}( \ldots (\text{enc\_K}_{E(t)}(\text{enc\_K}_{E(Q)}(B_i^{-1}))) \ldots )$ as a result of encryption of the transfer inverse function $B_i^{-1}$, and passes them to the matching information creating section 160. Here and in the following explanation, encrypting each inverse function means encrypting parameters composing each inverse function such as k(i)' and p.

The matching information creating section 160 creates the set of matching information $w_i^{(0)}$ from the received his or her identification information $I_i^{(0)}$, priority list $L_i^{(0)}$, permuting inverse function $D_i^{(0)}$, transfer inverse function $E_i^{(0)}$, processing information $m_i^{(0)}$, $n_i^{(0)}$. The sending section 165 sends the received set of matching information $w_i^{(0)}$ to the mediating computer 200c that first mediates information.

When the matching result is publicized by the service provider, the computer for a user 100c obtains the matching result. For example, the service provider publicizes the matching result that is processed with the processing information of each member on its homepage, and the user downloads all the matching result from the homepage of the service provider. The receiving section 102 passes the received matching result to the decrypting section 545. The decrypting section 545 reads out the processing information p, v(i) from the processing information storing area 525 and tries to decrypts the matching result. If it can be decrypted, that matching result is the matching result for the user. As to be described later, the matching result of the embodiment includes the priority order of the counterpart member who makes a pair with him or her in the presented priority list and the same encrypting key as that set to the counterpart member who makes a pair with him or her. The user can confirm that the communication is based on the matching result by trying encrypting communication with the counterpart member who makes a pair with him or her by using the encrypting key included in the matching result.

Figure 20:
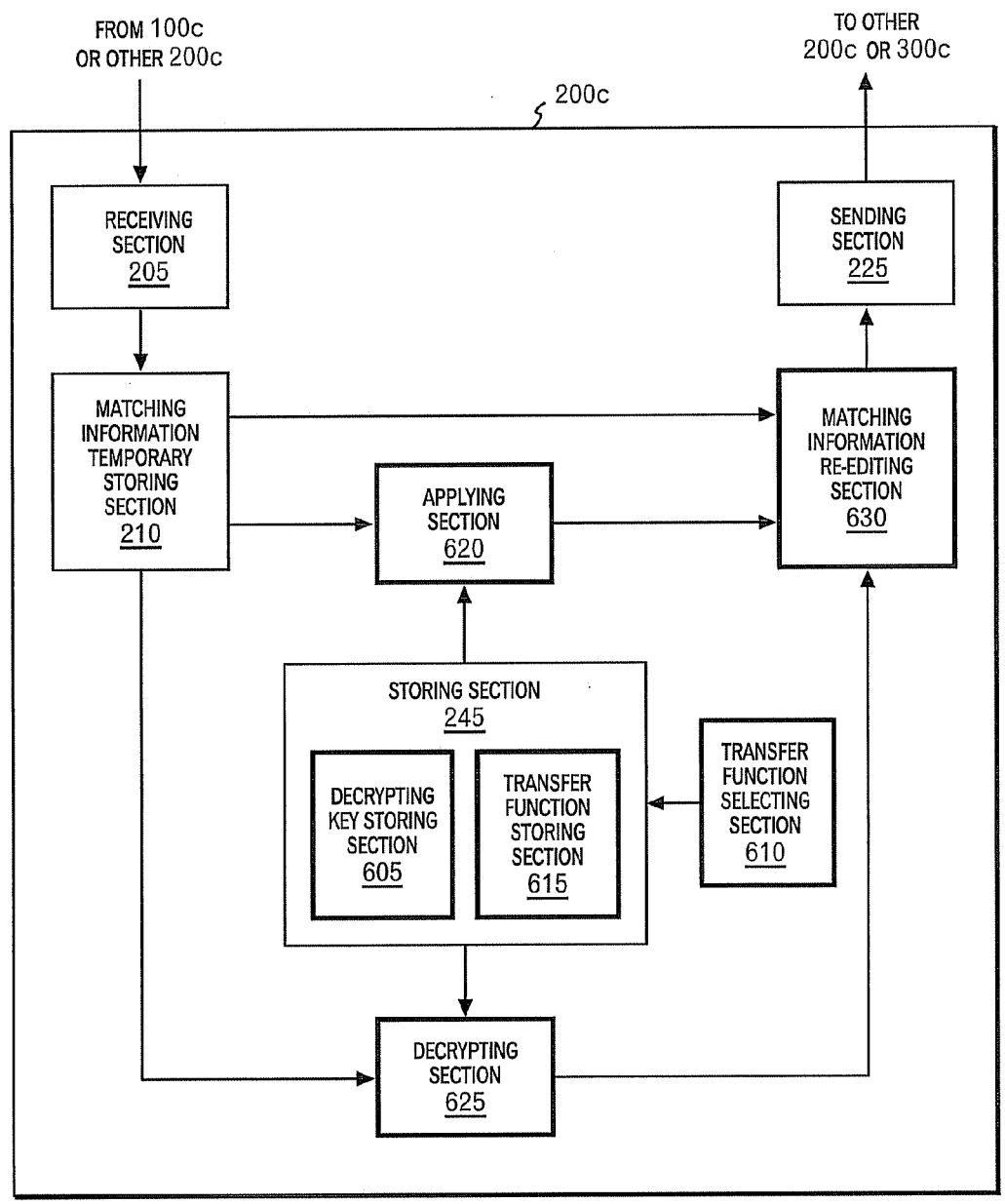
FIG. 20 is a diagram showing an example of a functional configuration of the mediating computer according to the fifth embodiment.

A functional configuration of each mediating computer 200c according to the fifth embodiment will be described with reference to FIG. 20. In FIG. 5, the mediating program stored in the hard disk of the hard disk drive 440 is loaded on the RAM 410 under the operating system's operation in response to the user's operation, issues a command to the CPU 400 or the other peripheral devices by such a process of the program to call a predetermined API routine of the operating system and causes the mediating computer 200c to function as a receiving section 205, a matching information temporary storing section 210, a storing section 245, a transfer function selecting section 610, an applying section 620, a decrypting section 625, a matching information re-editing section 630, and a sending section 225. The storing section 245 includes a decrypting key storing area 605 and a transfer function storing area 615. As the storing area, the HDD 440 can be used, for example. Although the decrypting key storing area 605 and the transfer function storing area 615 are shown as areas in the same storing section 245 in FIG. 20 for convenience, they may actually be areas present in a plurality of physically separated storing devices. Hereinafter, the mediating computer 200c that mediates information in the $j^{th}$ order will be described.

The receiving section 205 receives a string of the set of matching information $R^{j-1} = <w_1^{(j-1)}, w_2^{(j-1)}, \ldots, w_n^{(j-31\ 1)}>$ of each member from the $j-1^{st}$ mediating computer 200c, which is immediately before or a mediating computer before the last of each computer for a user 100c, and temporary stores it in the matching information temporary storing section 210. The set of matching information $w_i^{(j-1)}$ of each member includes his or her identification information $I_i^{(j-1)}$, the priority list $L_i^{(i-j)}$, the permuting inverse function $D_i^{(j-1)}$, the transfer inverse function $E_i^{(j-1)}$ and the processing information $m_i^{(j-1)}$, $n_i^{(j-1)}$.

The decrypting key storing area 605 stores a private key corresponding to the public key in the abovementioned public key encrypting method of a mediating computer that is in advance obtained by the computer for a user 100c. The mediating computer 200c in advance generates a set of keys and publicizes the key which is to be used for encryption on its homepage to make the encrypting key of the mediating computer be always available for a service user.

The transfer function selecting section 610 selects a transfer function $c_j$ that transfers a value of identification information of each member in the other group on the received priority list of each member into a different value. As mentioned above, the transfer function $c_j$ may be any function if only it can obtain the same result when it is exchanged with the transfer function $B_i$ that is selected in the computer for a user 100c in order as mentioned above, i.e., if only it can establish $B_i c_j = c_j B_i$. As an example of the transfer function $c_j$, $c_j(x) = x^{u(j)}$ mod p is selected in the embodiment. Here, u(j) is an element of $Z_q = \{0, \ldots, q-1\}$. The selected transfer function $c_j$ is stored in the transfer function storing area 615.

The applying section 620 reads out his or her identification information $I_i^{(j-1)}$ and the priority List $L_i^{(i-j)}$ from the matching information temporary storing section 210 and applies the transfer function $c_j$ that is read out from the transfer function storing area 615 to them respectively for a set of matching information $W_i^{(j-1)}$ of each member. The applied result of his or her identification information $I_i^{(j)} = c_j(I_i^{(j-i)})$ and the priority list $L_i^{(i)} = c_j \Rightarrow L_i^{(i-j)}$ are passed to the matching information re-editing section 630.

The decrypting section 625 reads out the permuting inverse information $D_i^{(j-i)} = \text{enc\_K}_E^{(j)}( \ldots (\text{enc\_K}_{E(t)}(\text{enc\_K}_{E(Q)}(A_i^{-1}))) \ldots )$ and the transfer inverse function $E_i^{(j-i)} = \text{enc\_K}_E^{(j)}( \ldots \text{enc\_K}_{E(t)}(\text{enc\_K}_{E(Q)}(B_i^{-1}))) \ldots )$ from the matching information temporary storing section 210 and decrypts them with the private key read out from decrypting key storing area 605. The decrypted result of the permuting inverse function $D_i^{(j)} = \text{enc\_K}_{E(j+1)}( \ldots (\text{enc\_K}_{E(t)}(\text{enc\_K}_{E(Q)}(A_i^{-1}))) \ldots )$ and the transfer inverse function $E_i^{(j)} = \text{enc\_K}_{E(j+1)}( \ldots \text{enc\_K}_{E(t)}(\text{enc\_K}_{E(Q)}(B_i^{-1}))) \ldots )$ are passed to the matching information re-editing section 630.

The matching information re-editing section 630 creates a new set of matching information $w_i^{(j)}$ by re-editing the set of matching information of each member by using $m_i^{(j-1)}$ and $n_i^{(j-1)}$ that are read out from the matching information temporary storing section 210, his or her identification information $I_i^{(j)}$ and the priority list $L_i^{(j)}$ that are passed from the applying section 620, the permuting inverse function $D_i^{(j)}$ that is passed from the decrypting section 625, and the transfer inverse function $E_i^{(j)}$ to create the new set of matching information of each member $w_i^{(i-1)}$. The matching information re-editing section 630 creates a string of a new set of matching information $R_j=><w_1^{(j)}, w_2^{(j)}), \ldots, w_{n(j)}>$ of each member. Here, the matching information re-editing section 630 randomly shuffles the string of the set of matching information of each member so that the orders of the elements $W_i^{(j-1)}$ of the received $R^{j-1}$ and the elements $w_1^{(j)}$ of $R_j$ to be sent differ. As a result, even if an input and output of the mediating computer 200c is monitored, the set of matching information belongs to which member is not known.

The shuffle is effective only when the elements $w_i^{(i-j)}$ of the $R_{j-1}$ received by the mediating computer 200c and the elements $w_i^{(j)}$ of the $R_j$ to be sent are completely different. For example, if $w_3^{(j-1)}$, the third element of $R^{j-1}$ corresponds to the fifth element $w_5^{(j)}$ with information included in the $w_3^{(j-1)}$ partially the same as information included in $w_5^{(j)}$, the same information tells that the third element of $R^{j-1}$, $w_3^{(j-1)}$ corresponds to the fifth element of $R_j$, $w_5^{(j)}$. Then, the matching information re-editing section 630 selects an appropriate h(j) (here, h(j) is an element of $Z_q = \{0, \ldots, q-1\}$ and obtains $m_i^{(j)}=(m_i^{(i-1)})^{h(j)}$, $n_i^{(j)}=(n_i^{(i-1)})^{h(j)}$). As such, his or her identification information $I_i^{(j)}$, the priority list $L_i^{(j)}$, the permuting inverse function $D_i^{(j)}$, the transfer inverse function $E_i^{(j)}$, and the processing information $m_i^{(j)}$, $n_i^{(j)}$ are included in the set of matching information of each member that is created by the matching information re-editing section 630.

The sending section 225 receives the string $R_j$ of the set of matching information of each member from the matching information re-editing section 630 and sends it to the next mediating computer 200c. If the mediating computer 200c is the last mediating computer 200c, the sending section 225 sends it to the computer for a service provider 300c.

Figure 21:
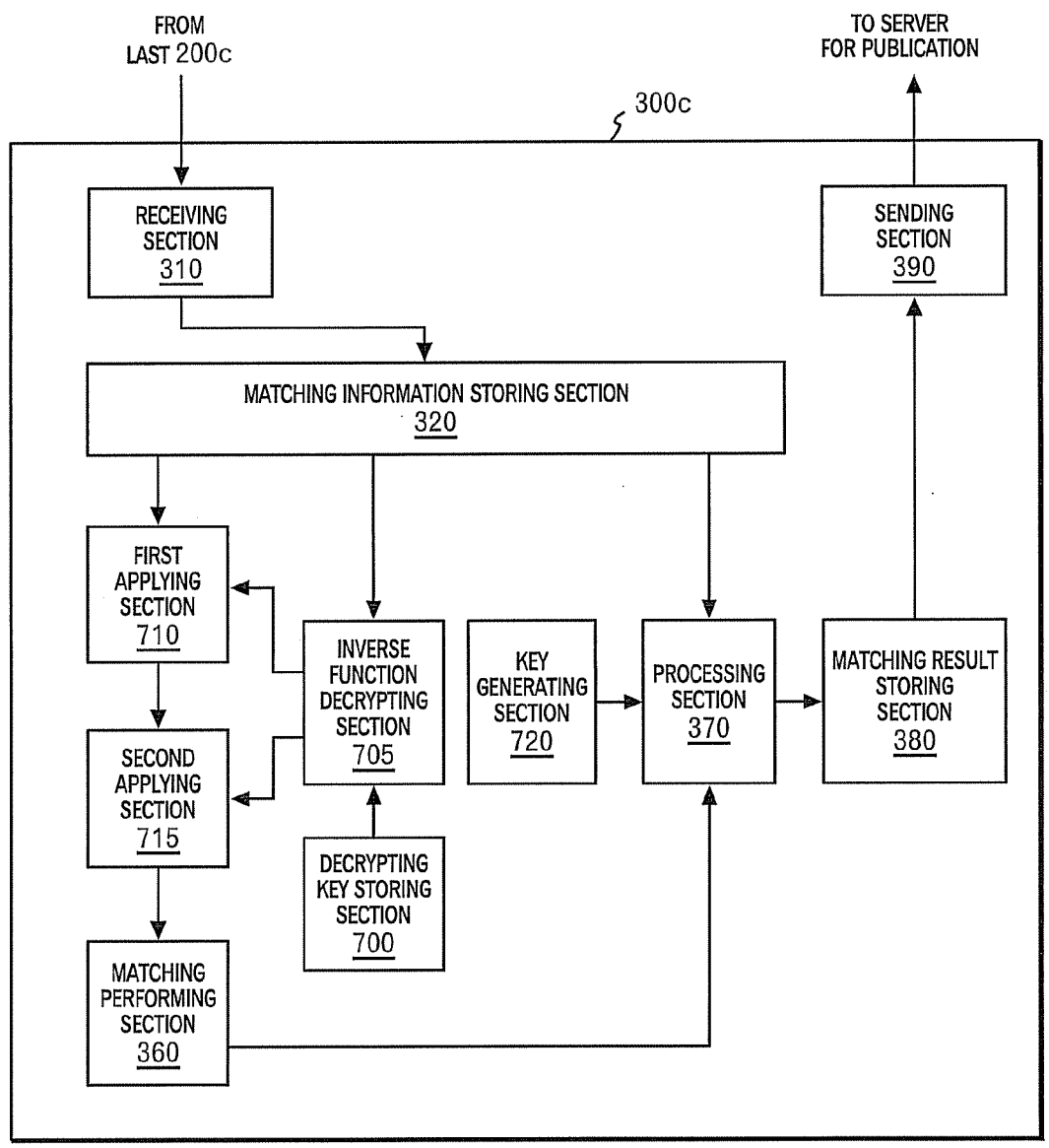
FIG. 21 is a diagram showing a functional configuration of the computer for a service provider according to the fifth embodiment.

FIG. 21 shows a functional configuration of the computer for a service provider 300c according to the fifth embodiment. In the fifth embodiment, the computer for a service provider stored in the hard disk of the hard disk drive 440 is loaded on the RAM 410 under the operating system's operation in response to the user's operation, issues a command to the CPU 400 or the other peripheral devices by such a process of the program to call a predetermined API routine of the operating system and causes the computer for a service provider 300c to function as a receiving section 310, a matching information temporary storing section 320, a decrypting key storing section 700, an inverse function decrypting section 705, a first applying section 710, a second applying section 715, a matching performing section 360, a key generating section 720, a processing section 370, a matching result applying section 380, and a sending section 390. As the storing area, the HDD 440 can be used, for example.

The receiving section receives a string of the set of matching information $R^t = <w_1^{(t)}, w_2^{(t)}, \ldots, w_n^{(t)}>$ of each member from the last t-th mediating computer 200c and stores it in the matching information storing section 320. The set of matching information of each member includes his or her identification information $I_i^{(t)}$, the priority list $L_i^{(t)}$, the permuting inverse function $D_i^{(t)}$, the transfer inverse function $E_i^{(t)}$, the processing information $m_i^{(t)}$, $n_i^{(t)}$.

The decrypting key storing section 700 stores a private key corresponds to the public key E(Q) in the public key encrypting method of the abovementioned service provider that is obtained by the computer for a user 100c in advance. The inverse function decrypting section 705 reads out the permuting inverse function $D_i^{(t)} = \text{enc\_}K_{E(Q)}(A_i^{-1})$ and the transfer inverse function $E_i^{(t)} = \text{enc\_}K_{E(Q)}(B_i^{-1})$ of each member from the matching information temporary storing section 320 with his or her identification information $I_i^{(t)}$, and decrypts them with the private key read out from the decrypting key storing section 700. The inverse function decrypting section 705 passes the decrypted result, the transfer inverse function $B_i^{-1}$ to the first applying section 710 in relation with his or her identification information $I_i^{(t)}$. Similarly, the inverse function decrypting section 705 passes the decrypted result, the permuting inverse function $A_i^{-1}$ to the second applying section 715 in relation with his or her identification information $I_i^{(t)}$.

The first applying section 710 receives the transfer inverse function $B_i^{-1}$ and his or her identification information $I_i^{(t)}$ from the inverse function decrypting section 705, and reads out the priority list $L_i^{(t)}$ corresponding to the his or her identification information $I_i^{(t)}$ from the matching information storing section 320. Then, the first applying section 710 applies the transfer inverse function $B_i^{-1}$ to his or her identification information $I_i^{(t)}$ and the identification information of each member listed on the priority list $L_i^{(t)}$ respectively. As a result of application, his or her identification information $I_i^{(t)}$ becomes $B_i^{-1}(I_i^{(t)}) = B_i^{-1}(c_t(\ldots(c_1(B(x_i)))\ldots)) = c_t(\ldots(c(x_i)\ldots)$. The priority list $L_i^{(t)}$ becomes $B_i^{-1} =>L_i^{(t)} = (B_i^{-1}, c_t, \ldots, c_1) =>L_i^{(0)} = (B_i^{-1}, c_t, \ldots, c_1, A_i, B_i) =>L_i = (A_i, c_t, \ldots, c_1) =>L_i$. The first applying section 710 passes the obtained his or her identification information $c_t(\ldots(c_1(x_i))\ldots)$ and the priority list $(A_i, c_t, \ldots, c_1) =>L_i$ to the second applying section 715 in relation with his or her identification information $I_i^{(t)}$.

The second applying section 715 applies the permuting inverse function $A_i^{-1}$ that is received from the inverse function decrypting section 705 to the priority list $(A_i, c_t, \ldots, c_t) =>L_i$ that is received from the first applying section 710. As a result of application, the priority list $L_i' = C =>L_i$ is obtained. Here, C is a composite function of a transfer function of t mediating computers 200c such as $C(x) = c_t(\ldots(c_1(x)\ldots))$. The second applying section 715 passes the obtained priority list $L_i'$ and his or her identification information $C(x_i)$ to the matching performing section 360 in relation with his or her identification information $I_i^{(t)}$.

The matching performing section 360 performs the matching based on his or her identification information $C(x_i)$ and the priority list $L_i' = <C(x_1), \ldots, C(x_n)>$ of each member both of which is received from the second applying section 715. His or her identification information and the identification information of each member in the other group listed in the priority order on the priority list have a value transferred by a composite function C of the transfer function of t mediating computers 200c. Thus, if at least one mediating computer 200c can be relied on, the user of the service or the contents of the priority list are not leaked to the service provider and the third party.

On the other hand, if the priority order of the priority list $L_i' = <C(x_1), \ldots, C(x_n)>$ is the same as the original priority order of $L_i = <x_1, \ldots, x_n>$ and C is $C(x_1) = C(x_m)$, the composite function fulfills $x_1 = x_m$. Therefore, the computer for a service provider 300c can perform the abovementioned matching from his or her identification information C(xi) and the priority list $L_i'$ of each member. The matching performing section 360 passes the priority order in the priority list of the counterpart who makes a pair with him or her to the processing section 370 in relation with his or her identification information $I_i^{(t)}$ as a result of the matching.

The key generating section 720 generates a plurality of different private keys in the private key encrypting method by the number of pairs and passes them to the processing section 370. The processing section 370 according to the embodiment selects a different private key received from the key generating section 720 for each pair obtained by the matching. Then, the processing section 370 processes the selected private key and the matching result in a state in which they can decrypted by only computer for a user of a member who makes a pair based on the processing information that is stored in the matching information temporary storing section 320 in relation with the identification information of the member who makes a pair.

It is assumed that a member $x_1$ and a member $x_m$ make a pair, with the member $x_1$ being listed at the third order in the priority list of the member $x_m$ and the member $x_m$ being listed at the first order in the priority list of the member $x_1$. Then, the processing section 370 selects a private key for a pair of the member $x_1$ and the member $x_m$, and processes the private key and the order first in a state in which they can be decrypted by only the computer for a user of the member $x_1$ based on the processing information $m1^{(t)}$, $n1^{(t)}$ stored in the matching information temporary storing section 320 in relation with the identification information $I_1^{(t)}$ of the member $x_1$. The processing section 370 also processes the private key and the order third in a state in which they can be decrypted by only the computer for a user of the member $x_m$ based on the processing information $m_m^{(t)}$, $n_m^{(t)}$ stored in the matching information temporary storing section 320 in relation with the identification information $I_m^{(t)}$ of the member $x_m$. The service provider has no idea about the counterpart member who makes a pair but knows the member's order on the priority list.

A processing method by the processing section 370 is shown below. First, it selects a suitable s(i) (here, s(i) is an element of $Zq=\{0, \ldots, q-1\}$) and calculates an encrypting key $K_i=(ni^{(t)})^{s(i)}=g^{v(i)s(i)h(1)\cdots h(t)}$ mod p for encrypting the matching result and the selected private key. Then, it calculates the private key for returning $(m_i^{(t)s(i)}=g^{s(i)h(1)\cdots h(t)}$ so that only the member $x_i$ can calculate the encrypting key $K_i$. As each member $x_i$ knows p and v(i), the member can calculate $((m_i^{(t)s(i)})^{v(i)}$ mod p from the private key for returning $(m_i^{(t)})^{s(i)}$ to obtain the encrypting key $K_i$. Then, the processing section 370 encrypts the matching result and the selected private key with the encrypting key $K_i$ and passes it to the sending section 390 through matching result storing section 380 in relation with the private key for returning $(m_i^{(t)})^{s(i)}$.

The sending section 390 sends the private key $(m_i^{(t)})^{s(i)}$ received from the processing section 370 and the matching result and the private key encrypted with the encrypting key $K_i$ to a server to publicize them on the homepage or the like of the service provider in relation with each other.

Figure 22:
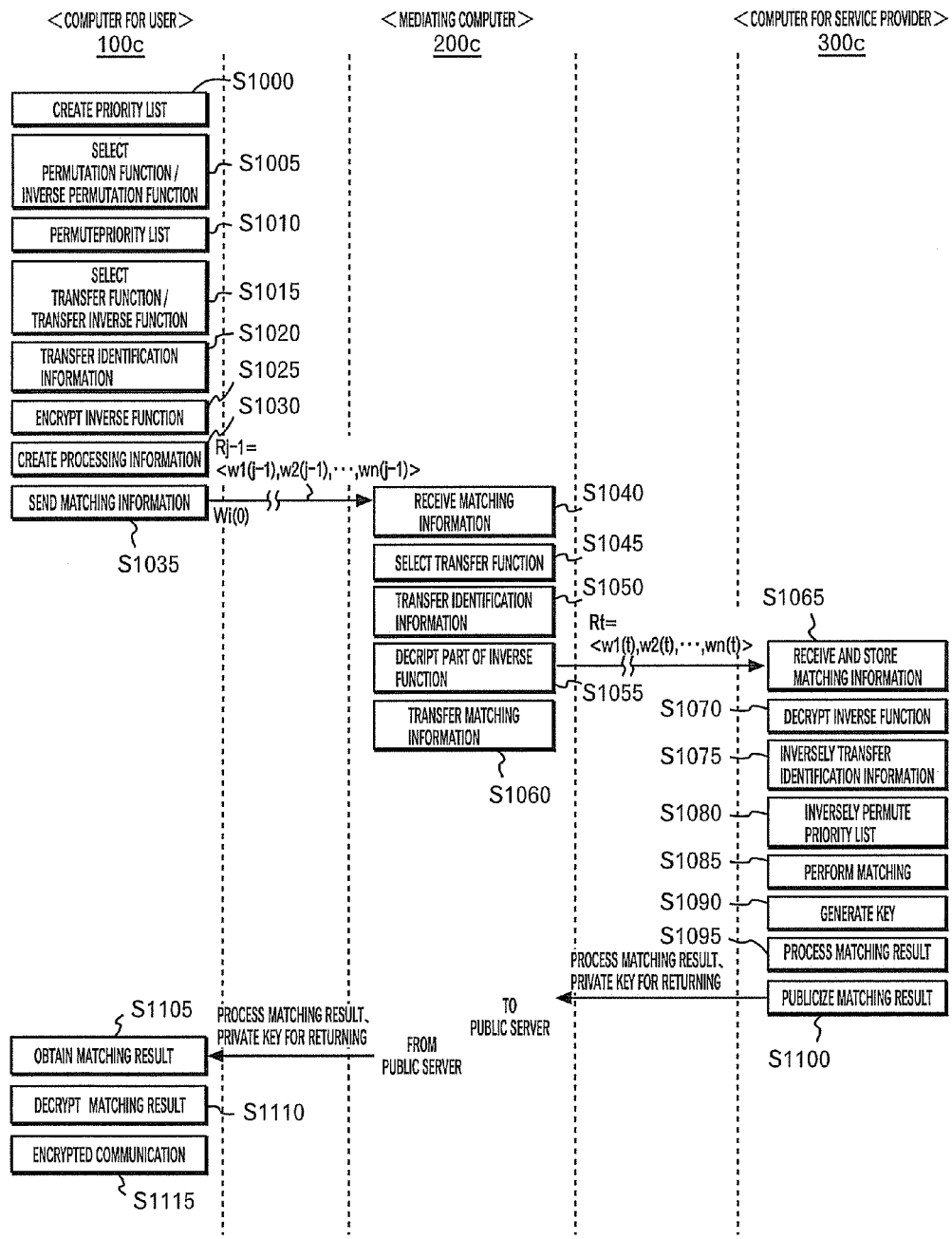
FIG. 22 is a diagram for showing a flowchart showing an example of processes provided by the matching service according to the fifth embodiment.

Now, an example of a flow of processes of providing the matching service according to the fifth embodiment will be described with reference with FIG. 22. It is assumed that each mediating computer 200c and the computer for a service provider 300c generate a set of keys of a public key and a private key and publicize the set, respectively, with the private key being stored in the decrypting key storing areas 605 and 700 as preprocessing. On the other hand, it is assumed that each computer for a user 100c obtains a public key of a plurality of mediating computers and a public key of a service provider and stores them in the encrypting key storing area 125.

The computer for a coordinating user 100c creates the identification table showing relationship between the members and their identification information, and the computers for a user 100c of the members receive the identification table respectively and store it in the identification table storing area 115.

Then the processing starts. First, the computer for a user 100c obtains the priority information of members in the other group via an input device such as a keyboard from a user, and creates the priority list in which the identification information of the counterpart member is permuted in the priority order by using the identification table read out from the identification table storing area 115 (step 1000). The computer for a user 100c selects the permuting function for permuting the priority order of the priority list and the permuting inverse function for recovering the original order according to the permuting information (step 1005), and stores them in permuting function/permuting inverse function storing area 505. The computer for a user 100c sorts the priority list of the priority list according to the permuting function read out from the permuting function/permuting inverse function storing area 505 (step 1010).

The computer for a user 100c selects the transfer function for transferring a value of the identification information of each member in the other group on the priority list into a different value and the transfer inverse function for returning the transfer which was performed according to the transfer function (step 1015) and stores them in the transfer function/transfer inverse function storing area 515. Then, the computer for a user 100c transfers the identification information of each member on the priority list and his or her identification information according to the transfer function read out from the transfer function/transfer inverse function storing area 515 (step 1020). Either permuting of the priority order and transfer of the value of the identification information may be performed first.

Next, the computer for a user 100c encrypts the permuting inverse function read out from the permuting function/permuting inverse function storing area 505 and the transfer inverse function read out from the transfer function/transfer inverse function storing area 515 with a public key of a service provider and a plurality of public keys of a plurality of mediating computers read out from the encrypting key storing area 125 (step 1025). The computer for a user 100c creates the processing information used by the service user to process the matching result in a state in which the result can be decrypted by only the computer 100c for a user of a person concerned (step 1030).

Finally, the computer for a user 100c creates the set $w_i^{(0)}$ including the processed identification information of a user, the priority list and the transfer inverse function and the permuting inverse function and the processing information and sends the set to the first mediating computer 200b (step 1035).

The $J^{th}$(j=1-t) mediating computer 200c receives a string of the set of matching information $R^{j-1}=<w1^{(j-1)}, w2^{(j-1)}, \ldots, w_n^{(j-1)}>$ of each member directly from the computer for a user 100c of each member or via the j-1$^{st}$ mediating computer 200c (step 1040). The mediating computer 200c selects the transfer function for transferring his or her identification information and the identification information of each member in the other group on the priority list included in the received set of matching information $w_i^{(j-1)}$ of each member into different values (step 1045) and transfers the values of the identification information with the selected transfer function (step 1050).

The mediating computer 200c decrypts the transfer inverse function and the permuting inverse function of each member included in the received set of matching information $w_i^{(j-1)}$ of each member with a private key corresponding to a public key of the mediating computer 200c read out from the decrypting key storing area 605 (step 1055). Finally, the mediating computer 200c creates a new set of matching information $w_i^{(j)}$ including the processed his or her identification information, priority list, transfer inverse function, permuting inverse function, and processing information for each member. Then, the mediating computer 200c sends a string of the new set of matching information $R_j=<w_1^{(j)}, w_2^{(j)}, \ldots, w_n(j)>$ to the $j+1^{st}$ mediating computer 200c, or if the mediating computer 200c is the last mediating computer 200c for mediating information, sends it to the computer for a service provider 300c (step 1060).

At step 1060, it is preferable that the string of the set of matching information $R_j=<w_1^{(j)}, w_2^{(j)}, \ldots, w_n^{(j)}>$ of each member that is sent by the mediating computer 200c is randomly shuffled so that the order of permuting of $w_i^{(j)}$ differs from that of the $w_1^{(j-1)}$. In such a case, the mediating computer 200c properly transfers the processing information so that even a part of information included in $w_i^{(j-1)}$ is not included in $w_i^{(j)}$ as it is to make the shuffle effectively functions.

The computer for a service provider 300c receives a string of a set of matching information $R^t=<w_1^{(t)}, w_2^{(t)}, \ldots, w_n^{(t)}>$ of each member via a plurality of mediating computers 200c and stores it in the matching information temporary storing section 320 (step 1065). In receiving, his or her identification information and the identification information of each member in the other group in the priority list included in the set of matching information $w_i^{(t)}$ indicate different values if they are the identification information of the same member. This is because that the transfer function selected by each mediating computer 200c is equally applied to the identification information in the priority list of all members and his or her identification information, but the transfer function selected by each computer for a user 100c is only applied to the identification information in his or her priority list and his or her identification information.

Then, the computer for a service provider 300c first decrypts the transfer inverse function and permuting inverse function included in the set of matching information $w_i^{(t)}$ of each member with the private key of the service provider read out from the decrypting key storing section 700 (step 1070). Then, the computer for a service provider 300c applies a corresponding transfer inverse function to his or her identification information and the identification information of each member in the other group on the priority list included in the set of matching information $w_i^{(t)}$ of each member (step 1075). As a result, the identification information in the priority list and his or her identification information of each member are returned to their original form for transfer by the transfer function selected by each member. Therefore, if they are the same identification information, they indicate the same value. On the other hand, as the identification information on the priority list and his or her identification information for each member stay in a state as they are transferred for a plurality of transfer functions that are selected by the respective mediating computers 200c, the service provider cannot recognize the contents of the priority list.

The computer for a service provider 300c applies a corresponding permuting inverse function to the priority list included in the set of matching information $w_i^{(t)}$ of each member (step 1080). As a result, the priority order on the priority list of each member is returned to the original priority order that is decided by each member. Either application of the transfer inverse function or application of permuting inverse function may be performed first.

The computer for a service provider 300c performs matching between two groups based on his or her identification information and the priority list for all members, while keeping a value of his or her identification information and a value of the identification information of each member in the other group on the priority list as encrypted with the transfer function that is selected by the mediating computer 200c (step 1085).

Next, the computer for a service provider 300c generates a different encrypting key for each pair that is obtained by the matching (step 1090). The encrypting key may be a key in the private key encrypting method. The computer for a service provider 300c processes the generated key and the matching result in a state in which they can be decrypted by only the computer for a user 100c of the member based on the processing information stored in the matching information storing section 320 in relation with the identification information of the member who makes a pair with him or her (step 1095). Here, the matching result is the priority order of the member in the other group who makes a pair with him or her.

The computer for a service provider 300c finally sends the processed encrypting key and the matching result of each member to the public server in order to publicize the matching result to each member such as by placing it on the homepage or the like (step 1100).

When the matching result is publicized by the public server, the computer for a user 100c requests all the matching results from public server and receives all the matching results (step 1105). Then, the computer for a user 100c tries decryption of the received matching result one by one based on the processing information read out from the processing information storing area 525 (step 1110). The decrypted matching result is the matching result of the computer for a user 100c.

The matching result includes the priority order of a member in the other group who makes a pair with him or her on his or her priority list and preferably, the same private key included in the matching result of members in the other group who makes a pair with him or her. Then, the computer 100c for a user obtains a member in the other group who is placed at the priority order included in the decrypted matching result from the priority list of itself and tries an encrypted communication by using the other group who makes a pair with him or her and an encrypting key included in the matching result (step 1115).

As mentioned above, according to the fifth embodiment, values of the identification information of members in the other group on the priority list of a user are equally transferred by the mediating computer 200b. The matching result is publicized as it is processed in a state in which the result can be decrypted only by himself or herself. Therefore, if at least a mediating computer 200c can be reliable, confidentiality of the contents of the priority list and the matching result can be maintained so that security of the matching service can be further enhanced in the embodiment.

The present invention has been described by using the embodiment, though, the technical scope of the present invention is not limited to the range described in the embodiment. The present invention can be applied to any kind of decision if only it can decide a pair by matching such as decision of an opponent in a game or decision of seating arrangement in a party as well as decision of a trading partner such as matching between a supplier and a buyer. It is apparent to those skilled in the art that various modifications and improvements are possible to the abovementioned embodiments. Therefore, it is a matter of course that embodiments with such a modification or an improvement are also included in the technical scope of the present invention.

The invention claimed is:

1. A non-transitory storage medium storing program for a service provider for providing a matching service performed on a computer for the service provider, wherein said program causes a computer to perform:

receiving from each computer for a user of each member in two groups who uses a service via a plurality of mediating computers that mediate information sent to the service provider, a set of his or her identification information that is transferred by a first transfer function that is selected in his or her computer, a priority list in which identification information of each member in the other group, which is permuted in said his or her priority order and transferred by said first transfer function, is permuted by a permuting function that is selected in said his or her computer, a parameter composing a transfer inverse function which is an inverse function of said first transfer function, and a parameter composing a permuting inverse function which is an inverse function of said permuting function, both of which are encrypted with a first encrypting key of said computer for the service provider, and processing information to be used in processing a matching result in a state in which the result is decrypted by only the computer for a person concerned, wherein said his or her identification information and the identification information of each member in said other group that is listed in said priority list are respectively transferred by a plurality of second transfer functions, each of which is selected in each of said mediating computers;

storing said priority list, said parameter composing said transfer inverse function and said parameter composing said permuting inverse function, and said processing information in a matching information storing section in relation with his or her identification information for said received set for each member;

decrypting said parameter composing said transfer inverse function and said parameter composing said permuting inverse function of each member that are read out from said matching information storing section with a first decrypting key that is kept in said computer for said service provider corresponding to said first encrypting key of said service provider;

applying said transfer inverse function of each member to said his or her identification information that is read out from said matching information storing section;

applying said transfer inverse function of each member and permuting inverse function of each member to said his or her priority list that is read out from said matching information storing section;

performing matching between said two groups based on said his or her identification information and said priority list of all members in the two groups, with said his or her identification information and the identification information of each member in said other group on said priority list being transferred by said plurality of second transfer functions;

generating a plurality of second different encrypting keys for each pair obtained as a result of the matching;

processing, for each member in the two groups, his or her second encrypting key and his or her matching result in a state in which they are decrypted by only his or her computer for a user based on said processing information that is stored in said matching information storing section in relation with his or her identification information; and publicizing said processed second encrypting key and matching result of said each member, wherein said each member can make an encrypted communication with said counterpart member who makes a pair with him or her by using said his or her second encrypting key, which can be decrypted in his or her computer.

2. A computer for a service provider for providing a matching service that is connected with a plurality of mediating computers that mediates information sent from each computer for a user of each member in the two groups who uses the matching service via a network, comprising:

a computer processor and a memory;

a receiving section for receiving from each computer for a user via said plurality of mediating computers, a set of his or her identification information that is transferred by a first transfer function that is selected in his or her computer for a user, a priority list in which the identification information of each member in the other group, which is permuted in said his or her priority order and transferred by said first transfer function, is permuted by a permuting function that is selected in said his or her computer for a user, a parameter composing a transfer inverse function which is an inverse function of said first transfer function, and a parameter composing a permuting inverse function which is an inverse function of said permuting function, both of which are encrypted with a first encrypting key of said computer for the service provider, and processing information to be used in processing a matching result in a state in which the result is processed by only the computer for a person concerned, wherein said his or her identification information and the identification information of each member in said other group that is listed in said priority list are respectively transferred by a plurality of second transfer functions, of which is selected in each of said mediating computers;

a matching information storing section for storing said priority list, said parameter composing said transfer inverse function and said parameter composing said permuting inverse function, and said processing information included in said received set of each of said members in relation with said his or her identification information;

a decrypting key storing section for storing a first decrypting key corresponding to said encrypting key of said computer for the service provider;

a decrypting section for decrypting said parameter composing said transfer inverse function and said parameter composing said permuting inverse function of each member that are read out from said matching information storing section with said first decrypting key that is read out from said decrypting key storing section;

a first applying section for applying said transfer inverse function of each member to the identification information of each member in the other group listed in said his or her priority list and said his or her identification information which are read out from said matching information storing section;

a second applying section for applying said permuting inverse function of each member to said his or her priority list that is read out from said matching information storing section;

a matching performing section for performing matching between said two groups based on said his or her identification information and said priority list of all members, with said his or her identification information and the identification information of each member in said other group on said priority list being transferred by said plurality of second transfer functions;

a generating section for generating a plurality of second different encrypting keys for each pair obtained as a result of the matching;

a processing section for processing, for each member in the two groups, his or her second encrypting key and his or her matching result in a state in which they are decrypted by only his or her computer for a user based on said processing information that is read out in said matching information storing section in relation with his or her identification information; and a sending section for sending said processed second encrypting key and matching result of said each member for publication.

3. A method for providing a matching service in a computer for a service provider, comprising:

receiving from each computer for a user of each member in two groups who uses the matching service via a plurality of mediating computers that mediate information sent to the service provider, a set of his or her identification information that is transferred by a first transfer function that is selected in his or her computer, a priority list in which identification information of each member in the other group, which is permuted in said his or her priority order and transferred by said first transfer function, is permuted by a permuting function that is selected in said his or her computer, a parameter composing a transfer inverse function which is an inverse function of said first transfer function, and a parameter composing a permuting inverse function which is an inverse function of said permuting function, both of which are encrypted with a first encrypting key of said computer for the service provider, and processing information to be used in processing a matching result in a state in which the result is decrypted by only the computer for a person concerned, wherein said his or her identification information and the identification information of each member in said other group that is listed in said priority list are respectively transferred by a plurality of second transfer functions, each of which is selected in each of said mediating computers;

storing said priority list, said parameter composing said transfer inverse function and said parameter composing said permuting inverse function, and said processing information in a matching information storing section in relation with his or her identification information for said received set for each member;

decrypting said parameter composing said transfer inverse function and said parameter composing said permuting inverse function of each member that are read out from said matching information storing section with a first decrypting key that is kept in said computer for said service provider corresponding to said first encrypting key of said service provider;

applying said transfer inverse function of each member to said his or her identification information that is read out from said matching information storing section;

applying said transfer inverse function of each member and permuting inverse function of each member to said his or her priority list that is read out from said matching information storing section;

performing matching between said two groups based on said his or her identification information and said priority list of all members in the two groups, with said his or her identification information and the identification information of each member in said other group on said priority list being transferred by said plurality of second transfer functions;

generating a plurality of second different encrypting keys for each pair obtained as a result of the matching;

processing, for each member in the two groups, his or her second encrypting key and his or her matching result in a state in which they are decrypted by only his or her computer for a user based on said processing information that is stored in said matching information storing section in relation with his or her identification information; and publicizing said processed second encrypting key and matching result of said each member.

* * * * *